United States Patent
Freitas et al.

(10) Patent No.: US 12,456,336 B2
(45) Date of Patent: Oct. 28, 2025

(54) IN-VEHICLE CAPABILITY DETERMINING SYSTEM AND METHOD OF USING

(71) Applicant: Woven by Toyota, Inc., Tokyo (JP)

(72) Inventors: Mário Freitas, Tokyo (JP); Laurent Fert, Tokyo (JP); Jérôme Peyroutat-Basse, Tokyo (JP); Takeshi Sekiya, Kawasaki (JP); Nik Chizhov, Tokyo (JP); Johan Lindqvist, Tokyo (JP); Vinit Tare, Palo Alto, CA (US); Erik Steggall, Palo Alto, CA (US); Kalyani Oruganti, Palo Alto, CA (US); Parth Patel, Palo Alto, CA (US); Justin Tjoa, Palo Alto, CA (US); Nicholas Hori, Palo Alto, CA (US)

(73) Assignee: WOVEN BY TOYOTA, INC., Tokyo (JP)

( * ) Notice: Subject to any disclaimer, the term of this patent is extended or adjusted under 35 U.S.C. 154(b) by 0 days.

(21) Appl. No.: 18/194,516

(22) Filed: Mar. 31, 2023

(65) Prior Publication Data
US 2024/0331465 A1    Oct. 3, 2024

(51) Int. Cl.
| | |
|---|---|
| G07C 5/08 | (2006.01) |
| G06F 16/2453 | (2019.01) |
| G06F 16/2455 | (2019.01) |
| G06Q 20/02 | (2012.01) |
| G06Q 20/34 | (2012.01) |
| G07C 5/00 | (2006.01) |

(52) U.S. Cl.
CPC ..... *G07C 5/0816* (2013.01); *G06F 16/24542* (2019.01); *G06F 16/24564* (2019.01); *G06Q 20/02* (2013.01); *G06Q 20/34* (2013.01); *G07C 5/008* (2013.01)

(58) Field of Classification Search
CPC . G07C 5/008; G07C 5/0816; G06F 16/24542; G06F 16/24564; G06Q 20/02; G06Q 20/34
See application file for complete search history.

(56) References Cited

U.S. PATENT DOCUMENTS

| | | | |
|---|---|---|---|
| 2013/0271275 A1* | 10/2013 | Schalk | H04W 4/48 340/438 |
| 2016/0071333 A1* | 3/2016 | Haidar | G07C 5/006 701/29.3 |
| 2016/0142493 A1 | 5/2016 | Moriguchi et al. | |
| 2018/0260740 A1* | 9/2018 | Namineni | G06Q 10/02 |
| 2021/0192867 A1* | 6/2021 | Fang | G07C 5/0816 |
| 2022/0123570 A1* | 4/2022 | Fuchs | B60L 58/12 |
| 2022/0204012 A1* | 6/2022 | Ko | H04W 4/40 |

FOREIGN PATENT DOCUMENTS

WO    2021/261226 A1    12/2021

* cited by examiner

*Primary Examiner* — Courtney Harmon
(74) *Attorney, Agent, or Firm* — HAUPTMAN HAM, LLP

(57) ABSTRACT

A method of requesting data from a vehicle includes determining a capability of an in-vehicle system, wherein the capability includes at least one of processing capabilities, memory capabilities or sensor capabilities. The method further includes receiving a rule, wherein the rule comprises a data collection request. The method further includes determining whether the capability of the in-vehicle system is able to satisfy the data collection request. The method further includes discarding the rule in response to a determination that the capability of the in-vehicle system is not able to satisfy the data collection request.

20 Claims, 8 Drawing Sheets

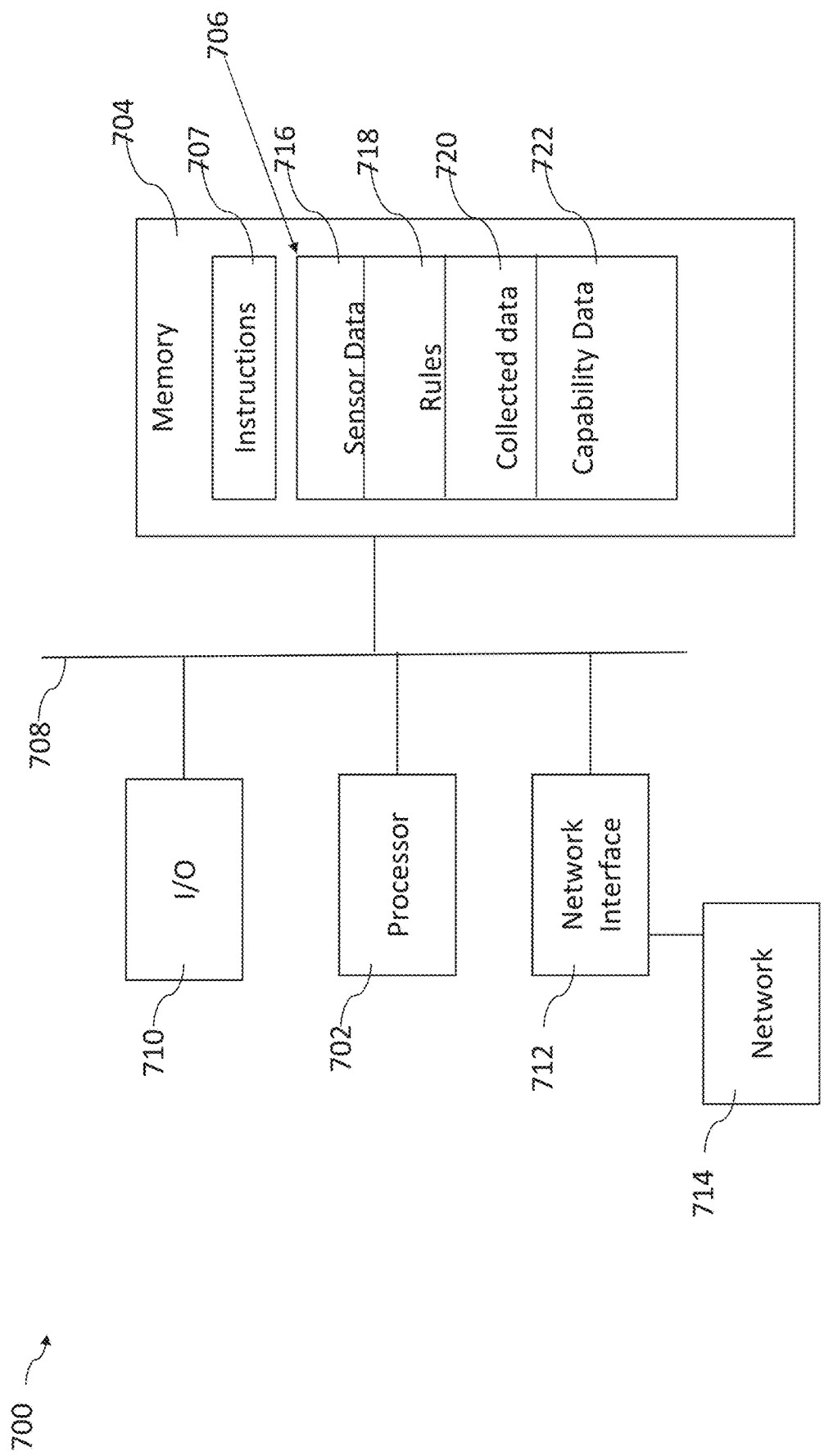

IN-VEHICLE CAPABILITY DETERMINING SYSTEM AND METHOD OF USING

BACKGROUND

In-vehicle systems have increasing levels of computerized technology. This computerized technology facilitates the use of sensors within the vehicle to collect information regarding the performance of the vehicle or information related to an environment surrounding the vehicle. This information is able to be transmitted to a central server for review and analysis in order to help improve performance of the vehicle or gather information related to environments through which the vehicle travels. In some instances, third parties, such as application developers, insurance companies, or government agencies, submit inquiries for information related to vehicle performance or the environment surrounding the vehicle.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 7 is a diagram of a system for implementing a request retrieval system in accordance with some embodiments.

DETAILED DESCRIPTION

Figure 1:
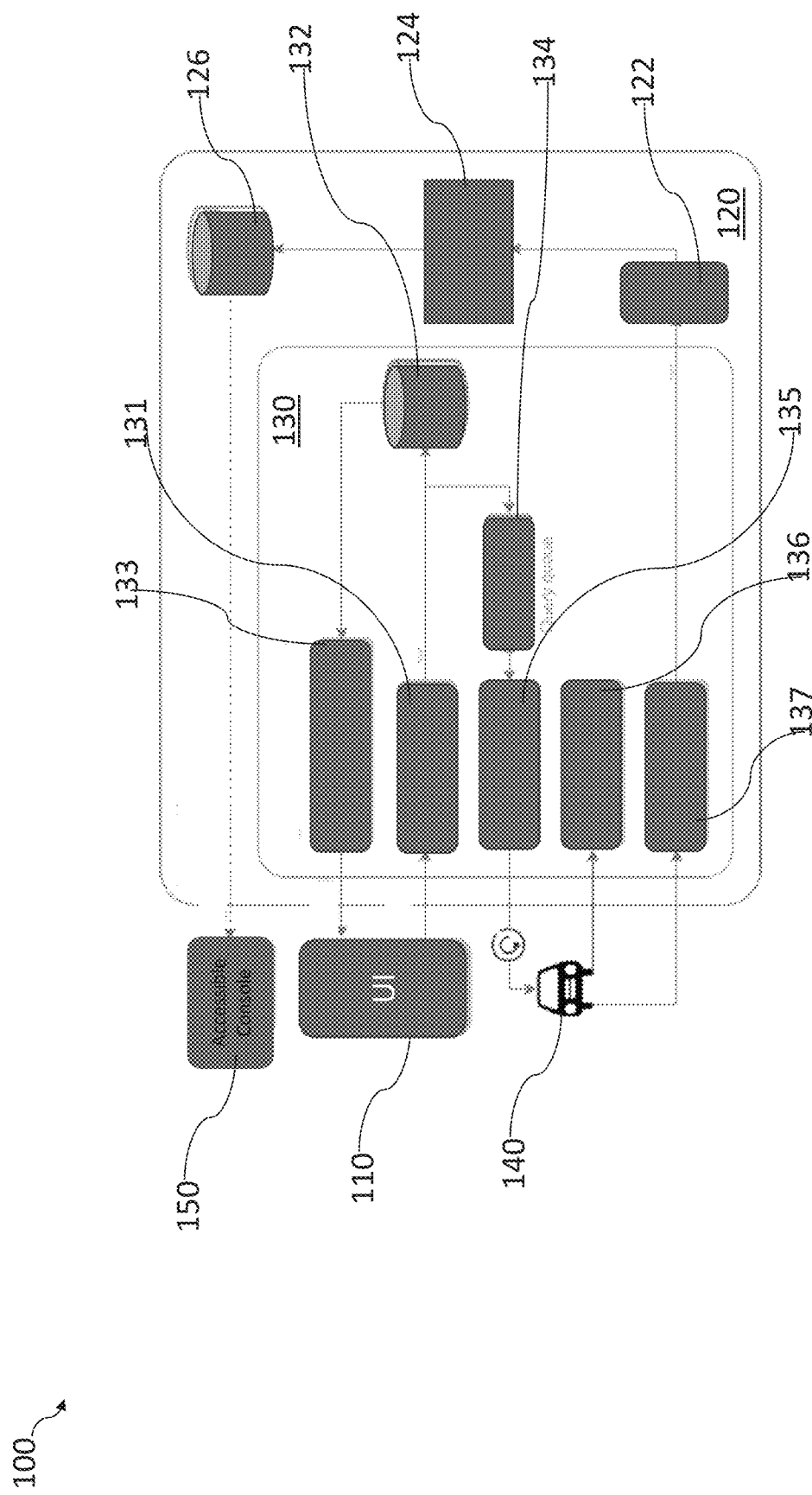
FIG. 1 is a schematic diagram of a request retrieval system in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Data collection is usable to fulfill rules or requests received by third party customers based on trigger events detected within one or more vehicles. Data collection for a rule or request occurs in response to a trigger event being detected. In some embodiments, the data collection includes retrieving data stored in a memory within the vehicle. In some embodiments, the data collection includes capturing newly detected data from one or more sensors within the vehicle. In some embodiments, the data collection includes both retrieval of stored data and capturing of new data.

In order to help improve efficient use of in-vehicle resources, this description includes a system and method for discarding of a rule if the vehicle that receives the rule lacks the capability of properly executing the rule. This is discarding helps to avoid unnecessary consumption of memory or processing capacity in the vehicle by attempting to collect data for a rule that cannot be successfully completed.

The rule defines the type of data collected, a duration of the sensor data to collect, a type of processing of the collected data, or other data collection information. In some embodiments, the lack of sufficient capability includes any of insufficient processing capacity, insufficient memory capacity, lack of a specific sensor, or counter instructions by a higher priority user or owner of the vehicle. For example, if the owner of a the vehicle refuses to share data with a specific third party customer, the owner could block execution of rules from that third party customer. In some embodiments, the owner is not permitted to block sharing data related to safety of the vehicle. Alternatively, in some embodiments, if the processor in the vehicle lacks the ability to perform a certain type of data compression requested by the rule, then the rule is discarded. Similarly, in some embodiments, if the rule calls for collection of data from a sensor which is not present in the vehicle or is not properly functioning in the vehicle, then the rule cannot properly be executed.

In some embodiments, if a rule is discarded, then an alert is sent to the third party customer. In some embodiments, the alert provides information for why the rule was discarded. In some embodiments, the alert provides information related to the capabilities of the vehicle system. In some embodiments, the alert provides a suggestion for how to adjust the rule to permit execution by the vehicle system. A non-limiting example of a suggestion would be to highlight a portion of the rule that caused the rule to be discarded; and providing alternatives to that portion that are available within the vehicle system. For example, in some embodiments, if the rule requests optical camera data, but the vehicle is only equipped with LiDAR, then the alert could highlight the visual data portion of the rule and provide a suggestion for the use of LiDAR. This would allow the third party customer to determine whether to adjust the rule to allow the rule to be executed on the vehicle system.

The capabilities of the vehicle system are also able to be tailored based on a priority level of the third party customer. For example, in some embodiments, the vehicle is prohibited from allowing access to the data requested by the third party customer unless the third party customer has a sufficiently high priority level. In some embodiments, the priority level is set based on the type of customer, e.g., government, police, retailer, entertainment, etc. In some embodiments, the priority level is set based on a fee paid by the third party customer. For example, in some embodiments, a surcharge fee is charged to access data from a sensor that provides highly sought after data, such as visual data.

FIG. 1 is a schematic diagram of a request retrieval system 100 in accordance with some embodiments. The request retrieval system 100 includes a user interface (UI) 110. The UI 110 is configured to receive a user request for data from a vehicle 140. The request retrieval system 100 further includes a server 120 configured to receive the user request from the UI 110; transmit the user request to the vehicle 140; receive data from the vehicle 140; and provide the data to the user via an accessible console 150. The server 120 includes a communication section 130 for communicating with the UI 110 and the vehicle 140. The request retrieval system 100 further includes an accessible console 150 configured to communicate data collected from the vehicle 140 to the user.

The UI 110 is configured to receive input instructions from the user. In some embodiments, the user includes a software developer. In some embodiments, the user includes a machine learning model developer. In some embodiments, the user includes an insurance provider. In some embodiments, the user includes law enforcement. In some embodiments, the user includes market research company. The UI 110 provides options for the user to select what type of vehicle and what type of data is being requested. In some embodiments, the UI 110 is capable of generating the data request using forms related to vehicle identifying information, data types being requested, start time and end time. In some embodiments, the start time and the end time are absolute times, such as Unix time, which is an elapsed time since a Unix epoch time. In some embodiments, the start time and the end time are relative times to the time that the data request is received by the vehicle. In some embodiments, the start time and the end time are relative times to a trigger event. In some embodiments, the UI 110 also provides the user with options for selecting a trigger event and a data collection duration relative to the trigger event. In some embodiments, the UI 110 includes information related to a type of vehicle from which data is requested. In some embodiments, the UI 110 includes vehicle ID which is able to uniquely identify a vehicle as a target of the request. For example, the vehicle ID includes a universally unique identifier (UUID) format. In some embodiments, the UI 110 includes data type that is able to identify the source of the data that user wants to collect. For example, the data type includes sensor ID of sensor that sensor data is collected from, application ID of application that application log is collected from. In some embodiment, the format of the sensor ID and application ID includes a universally unique identifier (UUID) format. In some embodiments, the UI 110 includes drop down menus. In some embodiments, the UI 110 includes editable fields for receiving information related to a data request. In some embodiments, the UI 110 provides information regarding what data option types are available to the user. In some embodiments, the data option types available depend on the user. For example, law enforcement is able to select more data options than an insurance provider in some embodiments.

In some embodiments, the UI 110 includes a graphical user interface (GUI). In some embodiments, the UI 110 includes a mobile terminal, such as a mobile telephone, connectable to the server 120. In some embodiments, the UI 110 includes a web interface such as RESTful API. In some embodiments, the UI 110 includes a computer connectable to the server 120. In some embodiments, the UI 110 is capable of wireless connection to the server 120. In some embodiments, the UI is connectable to the server 120 by a wired connection. The UI 110 is also able to provide the user with updates regarding a status of a data request. In some embodiments, the UI 110 provides status updates regarding a data request in response to an additional query by the user. In some embodiments, the UI 110 provides status updates regarding a data request upon receipt of updated information from the server 120 automatically without user interaction. In some embodiments, the status update causes the UI 110 to trigger an alert for the user. In some embodiments, the alert includes an audio or visual alert.

In some embodiments, the UI 110 includes a means for accepting payment of a fee from the user. In some embodiments, the UI 110 includes data entry fields to permit the user to enter payment card information. In some embodiments, the UI 110 includes a reader for detecting payment card information, such as a magnetic stripe reader, a bar code reader, a chip reader, or another suitable reader.

The server 120 includes a communication section 130 configured to communicate with the UI 110 and the vehicle 140. The communication section 130 includes a receiver 131 configured to receive data requests from the UI 110. In some embodiments, the receiver 131 includes a wireless receiver. In some embodiments, the receiver is configured to receive the data requests via a wired connection. In some embodiments, the receiver 131 is further configured to perform initial processing on the received data request. In some embodiments, the received data request includes priority level information. In some embodiments, the receiver 131 is configured to assign a priority level to the data request based on an identity of the user that submitted the data request or a fee paid by the user that submitted the data request. In some embodiments, the receiver 131 is configured to assign a request identification (ID) number to each received data request. In some embodiments, the server 120 is configured to limit access to certain sensors within the vehicle 140 based on an identity the user. For example, a third-party user will not be able to access sensor related to safety functions of the vehicle 140 in some embodiments.

The communication section 130 further includes a memory unit 132 configured to store data requests received by the receiver 131. In some embodiments, the memory unit 132 includes a random access memory, a solid state memory, or another type of memory. In some embodiments, the memory unit 132 is configured to store the data requests along with a status of the data request. In some embodiments, the status of the data request includes pending (prior to transmission of the data request to the vehicle 140); submitted (following transmission of the data request to the vehicle 140); and completed (following receipt of the requested data from the vehicle 140). In some embodiments, the memory unit 132 is accessible by the user. In some embodiments, updates to information in the memory unit 132 trigger notifications of a user associated with the information updated in the memory unit 132. In some embodiments, the memory unit 132 stores data requests in conjunction with time stamp data indicating a time at which the data request was received. In some embodiments, the memory unit 132 stores data requests in association with a priority level. In some embodiments, the priority level is determined based on an identity of the user. For example, in some embodiments, law enforcement has higher priority than an insurance provider, which has higher priority than a normal user, such as a software developer. In some embodiments, the priority level is determined based on a fee paid by the user. For example, in some embodiments, a user is able to pay a fee in order to increase a priority level of their request in order to obtain the requested data sooner. In some embodiments, the priority level of a data request is increased as an amount of time between initial storage of the data request and transmission of the data request to the vehicle increases.

The communication section 130 further includes a transmitter 133. The transmitter 133 is configured to transmit a status of data requests to the UI 110. In some embodiments, the status of the data requests is wirelessly transmitted to the UI 110. In some embodiments, the status of the data requests is transmitted to the UI 110 via a wired connection. In some embodiments, the transmitter 133 is configured to provide an update on a data request automatically in response to an update in the memory unit 132. In some embodiments, the transmitter 133 is configured to provide an update on a data request in response to a received update request from the user. In some embodiments, the transmitter 133 is configured to automatically transmit a request ID upon initially saving the data request in the memory unit 132. In some embodiments, the status of the data request includes a priority level of the data request. In some embodiments, the status of the data request includes an estimated time until the data request is transmitted to the vehicle 140.

The communication section 130 further includes a query queue 134 configured to store data requests in priority order for transmission to the vehicle 140. In some embodiments, the query queue 134 is integrated into the memory unit 132. In some embodiments, the query queue 134 is separate from the memory unit 132. In some embodiments, the query queue 134 is configured to retrieve data requests from the memory unit 132 based on priority level and time stamp information. In some embodiments, the query queue 134 is configured to order data requests based on priority level; and by time since initial saving in the memory unit 132 in response to data requests having a same priority level.

The communication section 130 further includes a transmitter 135 configured to transmit data requests to the vehicle 140 from the query queue 134. The transmitter 135 is configured to transmit the data requests to the vehicle 140 based on an order of the data requests in the query queue 134. In some embodiments, the data requests are transmitted to the vehicle 140 wirelessly. In some embodiments, the data requests are transmitted to the vehicle 140 by a wired connection. The data requests transmitted to the vehicle 140 include trigger event information, data duration information related to how long before and after the trigger event the data should be collected, and sensor information indicating a type of sensor of the vehicle 140 should collect the data. In some embodiments, the data requests transmitted to the vehicle 140 include priority level information. In some embodiments, the transmitter 135 is configured to transmit data requests to the vehicle 140 when the vehicle 140 sends a request to server 120 to transmit the data requests to the vehicle 140. In some embodiments, the transmitter 135 is configured to transmit data requests to the vehicle 140 any time the communication section 130 has sufficient connectivity to the vehicle 140 to transmit the data request unless the communication section 130 has received information indicating that the vehicle 140 is unable to accept a new data request. In some embodiments, the transmitter 135 is configured to transmit the data requests to the vehicle 140 periodically so long as the vehicle 140 is able to receive new data requests and the transmitter 135 has sufficient connectivity to the vehicle 140. In some embodiments, the transmitter 135 is configured to transmit the data requests to the vehicle 140 in batches, such as in groups of 5 data requests, 20 data requests or some other number of data requests. In some embodiments, the transmitter 135 is configured to request confirmation of receipt of the data request from the vehicle 140. In response to failing to receive confirmation of receipt from the vehicle for a predetermined time period, the transmitter 135 is configured to re-transmit the data request. In some embodiments, the status of the data request stored in the memory unit 132 is updated to indicate submission to the vehicle 140 in response to the communication section 130 receiving confirmation of receipt of the data request from the vehicle 140.

The communication section 130 further includes a receiver 136 configured to receive notification of the occurrence of trigger events from the vehicle 140. In some embodiments, the occurrence of a trigger event is receipt of a data request. In some embodiments, the receiver 136 is configured to receive the notification of the trigger events wirelessly. In some embodiments, the receiver 136 is configured to receive the notification of the trigger events via a wired connection. In some embodiments, the receiver 136 is configured to send a signal to the memory unit 132 to update a status of a data request related to the notified trigger event.

The communication section 130 further includes a receiver 137 configured to receive data from the vehicle 140 responsive to the data requests transmitted by the transmitter 135. In some embodiments, the data is split by the vehicle 140 into data packets that is the unit of transmission from the vehicle 140 to the server 120, and the receiver 137 receives the data packet from the vehicle 140. In some embodiments, the receiver 137 is configured to receive the data wirelessly. In some embodiments, the receiver 137 is configured to receive the data via a wired connection. In some embodiments, the receiver 137 is configured to send a signal to the memory unit 132 to update a status of a data request related to the receipt of requested data. In some embodiments, the data responsive a single data request is received in a single packet from the vehicle 140. In some embodiments, the data responsive to a single data request is received in multiple packets from the vehicle 140. The receiver 137 transfers the received data to a pre-processor 122.

The server 120 further includes the pre-processor 122 configured to receive data from the receiver 137 and perform pre-processing on the data to generate collected data. In some embodiments, the pre-processing includes reforming of data from multiple packets to compile data responsive to a data request. In some embodiments, the pre-processing includes de-serializing of data to compile structured data from a byte array that is received. In some embodiments, the pre-processing includes de-compressing of data if the data is compressed by the vehicle 140 before sending. In some embodiments, the pre-processing includes error correction by Error Correction Code (ECC) such as Reed-Solomon (RS) Code, Bose-Chaudhuri-Hocquenghem (BCH) code, Low-density parity-check (LDPC) code and the like. In some embodiments, the pre-processing includes smoothing of data by removing outlier values to reduce a risk of report incorrect data to the user. In some embodiments, the pre-processing includes associating data request ID information, priority level information or other suitable information with the received data from the receiver 137. In some embodiments, the data is pre-processed so that the information is provided to the user in a format that is easy to understand and does not rely on specialized knowledge or equipment to discern the information.

The server 120 further includes a data storage 126 configured to store the collected data generated by the data pre-processor 122. In some embodiments, the data storage 126 is integrated with the memory unit 132. In some embodiments, the data storage 126 is separate from the memory unit 132. In some embodiments, the data storage 126 includes a solid state drive (SSE), a random access memory or another suitable memory. In some embodiments, the data storage 126 is accessible by the user, e.g., using the UI 110 or an accessible console 150. In some embodiments, the data storage 126 is configured to notify the user in response to data related to a data request is available. In some embodiments, the notification includes an alert to the user. In some embodiments, the alert includes an audio or visual alert. In some embodiments, the data storage 126 is configured to cause the UI 110 or the accessible console 150 to automatically display the notification of an availability of the collected data. In some embodiments, the data storage 126 is accessible by a user using the accessible console 150 without the user submitting a data request. In some embodiments, the data within the data storage 126 are searchable by the user via the accessible console 150. In some embodiments, the collected data is visualized in the console 150.

The request retrieval system 100 further includes a vehicle 140. The vehicle 140 includes sensors to detect both an internal status of the vehicle 140 as well as an external environment surrounding the vehicle 140. In some embodiments, the sensors include a camera, a light distance and ranging (LiDAR) sensor, a radio distance and ranging (RADAR) sensor, a sound navigation and ranging (SONAR) sensor, an accelerometer, a steering wheel position, a speedometer, or another suitable sensor. The vehicle 140 is capable of receiving data requests, either wirelessly or via a wired connection.

In some embodiments, in response to receiving the data request, the vehicle 140 is configured to assign a data request ID to the received data request and the data request is processed to be agnostic to an originating system or program of the data request. In another embodiments, the communication section 130 instead of the vehicle 140 assigns the data request ID, and the data request ID is included in the data request that is sent from the communication section 130 to the vehicle 140. Making the data request agnostic to the originating system or program of the data request helps with expanding an ability of the vehicle 140 to receive and process a wide range of data requests from different users and systems. The vehicle 140 includes a processor for processing the data requests and determining what type of information from which sensors available in the vehicle 140 are capable of satisfying the data request. The vehicle 140 further includes a memory for storing data from the sensors. In some embodiments, the processor accesses the memory to determine whether any stored data is capable of satisfying the data request. The vehicle 140 is further capable of transmitting the data deemed to satisfy the data request to the server 120 either wirelessly or via a wired connection. In some embodiments, the processor is configured to attempt to satisfy received data requests in a priority order based on a received priority level of the data request. In some embodiments, the vehicle 140 is configured to transmit data to the server preferentially based on the received priority level of the data request.

In some embodiments, the memory and the processor of the vehicle 140 are configured to store and execute software applications in an electronic control unit (ECU) within the vehicle 140. In some embodiments, a data request is generated by the software application stored in the ECU. In some embodiments, the data request is generated in response to a trigger event, such as sudden acceleration, sudden braking, capturing sensor data including specific objects or specific scenes that are predefined in the software application, "crashing" of the software application, a detected abnormality in the software application, or another suitable detected occurrence. In some embodiments, the vehicle 140 is configured to generate a notification to a maintainer, e.g., the user, of the software application in response to detecting a trigger event associated with the software application. In some embodiments, the notification is transmitted, either wirelessly or through a wired connection, directly to the user, e.g., through the UI 110. In some embodiments, the notification is transmitted, either wirelessly or through a wired connection, to the user through the server 120. In some embodiments, the notification includes an audio or visual notification. In some embodiments, the notification is configured to cause the UI 110 to automatically display the notification without user interaction.

The request retrieval system 100 further includes an accessible console 150. The accessible console 150 permits the user to access the collected data stored in the data storage 126. In some embodiments, the accessible console 150 is integrated with the UI 110. In some embodiments, the accessible console 150 is separate from the UI 110. In some embodiments, the accessible console 150 includes another server separate from the server 120. In some embodiments, the accessible console 150 automatically receives collected data related to a data request from the user upon receipt of the collected data by the data storage 126. In some embodiments, the accessible console 150 permits the user to search the data storage 126 to determine whether any of the collected data stored in the data storage 126 are useful to the user without the user submitting a data request.

Using the request retrieval system 100 permits users to obtain information from one or more vehicles 140 in a format that is easy to understand without relying on specialized equipment to request or read the received data. The ability to prioritize data requests in the request retrieval system 100 help to ensure that law enforcement or other user is able to obtain data, while also permitting users to pay a fee to obtain data faster. This flexibility helps to improve the usefulness of the request retrieval system 100 for a wide range of users.

Figure 2:
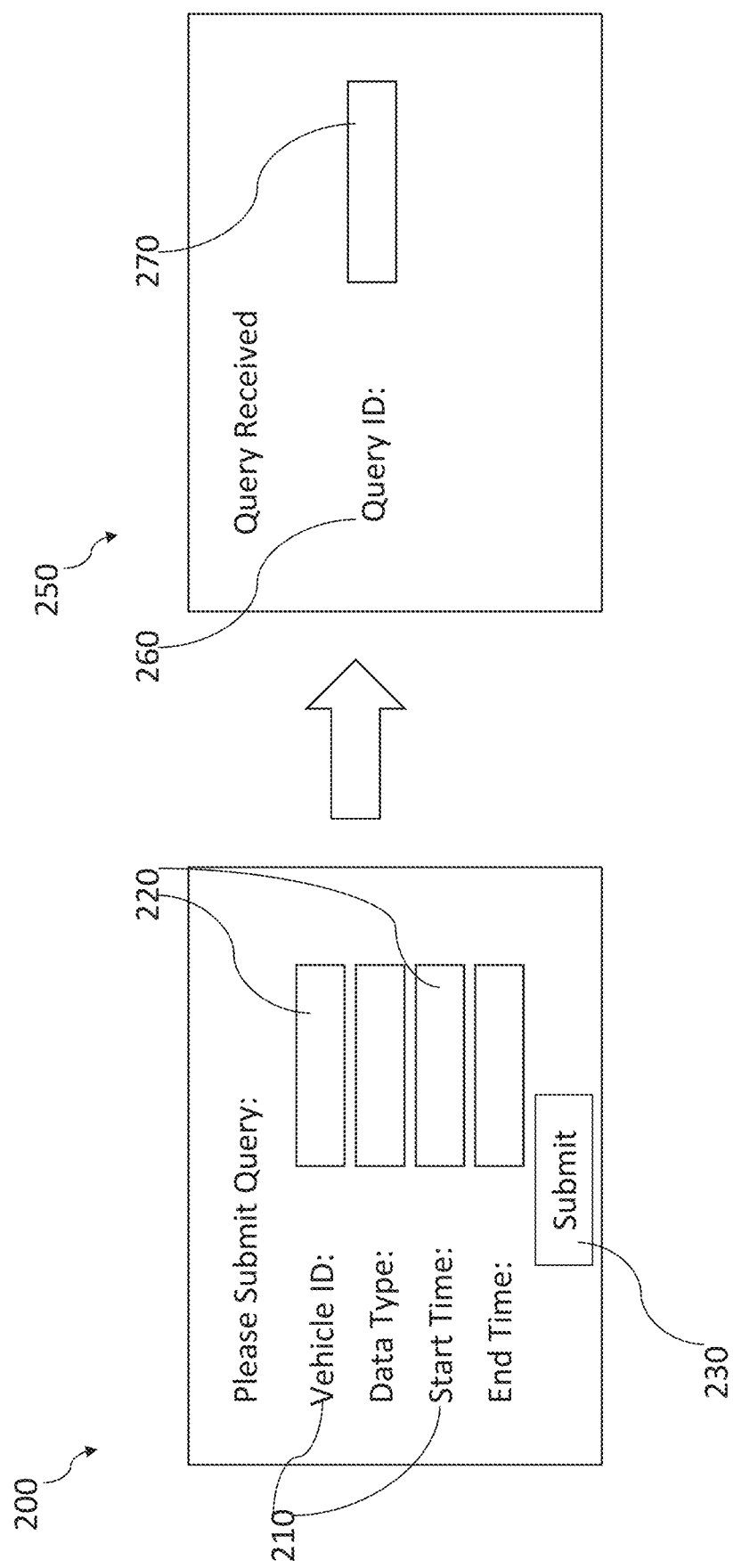
FIG. 2 is views of a graphical user interface (GUI) for a request retrieval system in accordance with some embodiments.

FIG. 2 is views of a graphical user interface (GUI) 200 and 250 for request retrieval system in accordance with some embodiments. In some embodiments, the GUI 200 is usable as UI 110 in request retrieval system 100 (FIG. 1). In some embodiments, the GUI 200 is usable to generate a data request for receipt by the receiver 131 (FIG. 1). The GUI 200 includes a plurality of information types 210 which identify a type of information that the GUI 200 is able to accept from the user. The GUI 200 further includes a plurality of fields 220 configured to receive information related to a corresponding information type 210 of the GUI 200. The GUI 200 further includes a submit button 230 configured to submit a data request to a server, e.g., server 120 (FIG. 1), based on the information in the fields 220. One of ordinary skill in the art would recognize that the names and number of the plurality of information types 210 is merely exemplary and that different numbers and types of information are also within the scope of this disclosure.

In some embodiments, the fields 220 includes fields for users to enter the vehicle ID, the data type, the start time and the end time. In some embodiments, the field 220 further includes a field for users to enter a priority level of the data request. In some embodiments, the GUI 200 further includes information related to how a user is able to increase a priority level of a data request, such as indicating a fee associated with each available priority level. In some embodiments, the GUI 200 includes fields 220 for allowing a user to enter log in information to establish an identity of the user. In some embodiments, the GUI 200 is configured to display a priority level of the user following receiving log in information. In some embodiments, the GUI 200 further includes fields 220 for receiving payment information related to fees for establishing a priority level of a data request.

The GUI 250 is configured to be displayed to the user after the user has selected the submit button 230 on GUI 200. In some embodiments, the GUI 250 is usable as the GUI 110 in the ODDR system 100 (FIG. 1). The GUI 250 includes information indicating that the data request has been received. The GUI 250 includes a query ID label 260 and a query ID field 270. Information for populating the query ID field 270 is received from a server, e.g., server 120 (FIG. 1), following the server receiving and storing the data request. In some embodiments, the GUI 250 includes information of the vehicle ID. In some embodiments, the GUI 250 includes information related to a priority level of the data request. In some embodiments, the GUI 250 includes information regarding a status of the data request, such as pending, submitted, completed, etc. In some embodiments, the GUI 250 includes information related to an estimated time until the data request is submitted to a vehicle, e.g., vehicle 140 (FIG. 1). In some embodiments, the GUI 250 is displayed automatically in response to receipt of query ID information from the server. In some embodiments, the GUI 250 is displayed in response to a user submitting a request for an update on an uploaded data request.

Figure 3:
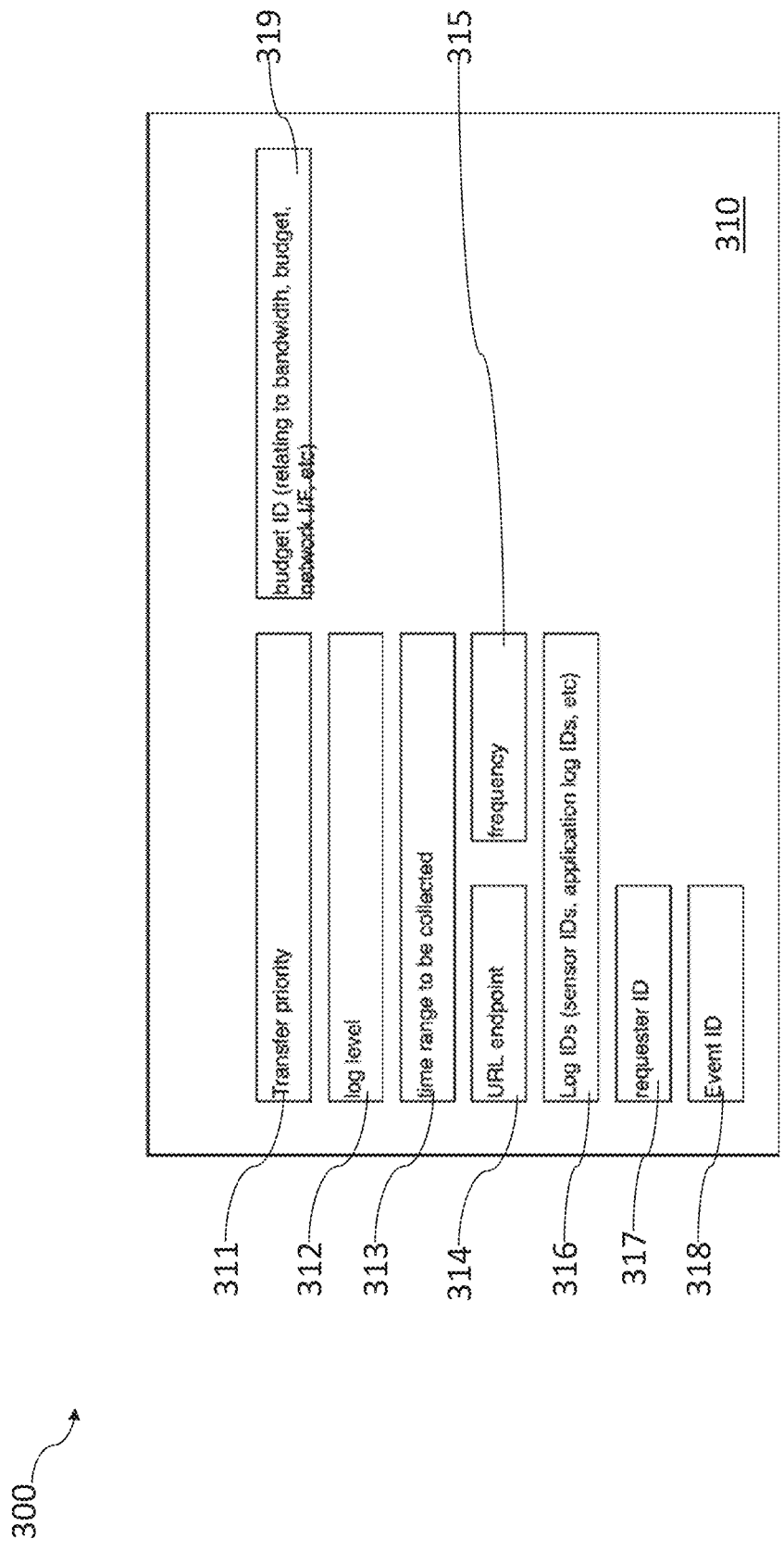
FIG. 3 is a diagram of a data structure of a request retrieval command in accordance with some embodiments.

FIG. 3 is a diagram of a data structure 300 of a request retrieval command 310 in accordance with some embodiments. In some embodiments, the request retrieval command 310 is transmitted from the server 120 to the vehicle 140 (FIG. 1). The request retrieval command 310 includes information related to a type of data sought by a data request to a vehicle, e.g., vehicle 140 (FIG. 1).

The request retrieval command 310 includes a transfer priority parameter 311 that indicates a priority level of the data request. The request retrieval command 310 further includes a log level parameter 312 that indicates what type of data, if any, should be retrieved from other applications on the vehicle. For example, in some embodiments, the request retrieval command 310 retrieves data from an object recognition application. The log level parameter 312 determines what type of data to retrieve from the other application, such as error level or critical level. In some embodiments, the log level parameter 312 is omitted from the request retrieval command 310 or the log level parameter 312 is left in a null state. The request retrieval command 310 further includes a time range to be collected parameter 313 that indicates a time period before and/or after a trigger event to collect data. The time range is corresponding to the start time and the end time that was entered in GUI 200 (FIG. 2) by the users. The request retrieval command 310 further includes a uniform resource locator (URL) endpoint parameter 314 that indicates a destination for the data collected in response to the data request. The request retrieval command 310 further includes a frequency parameter 315 that indicates how often, if ever, the data should be sampled from the rime range 313. For example, when the event time is t=100 sec, the time range comprises start time=−1 sec and end time=2 sec and the frequency is 10 Hz (100 msec cycle), then the data at t=99.0 sec, 99.1 sec, 99.2 sec, . . . 101.9 sec, 102.0 sec is collected by the request retrieval command. The request retrieval command 310 further includes a log ID parameter 316 that indicates types of sensors and/or applications usable to collect the data requested by the data request. In some embodiments, unique IDs (such as Universally unique identifier (UUID)) are pre-assigned to all the sensors and applications, and the unique IDs which the user want to collect data from is specified in the log ID parameter 316. The request retrieval command 310 further includes a requester ID parameter 317 that indicates an identity of the user that made the data request. The request retrieval command 310 further includes an event ID parameter 318 that indicates a trigger event associated with the data request. The request retrieval command 310 further includes a budget ID parameter 319 that indicates how much of the resources of the vehicle, e.g., vehicle 140 (FIG. 1), should be allocated to satisfying the data request. One of ordinary skill in the art would understand that additional parameters are possible in the request retrieval command 310. For example, in some embodiments, the request retrieval command 310 includes vehicle location parameter that indicates a geographic area where the trigger event is capable of occurring. One of ordinary skill in the art would also understand that the request retrieval command 310 does not always include all of the parameters in FIG. 3. For example, in some embodiments, the budget ID parameter 319 is omitted.

Figure 4:
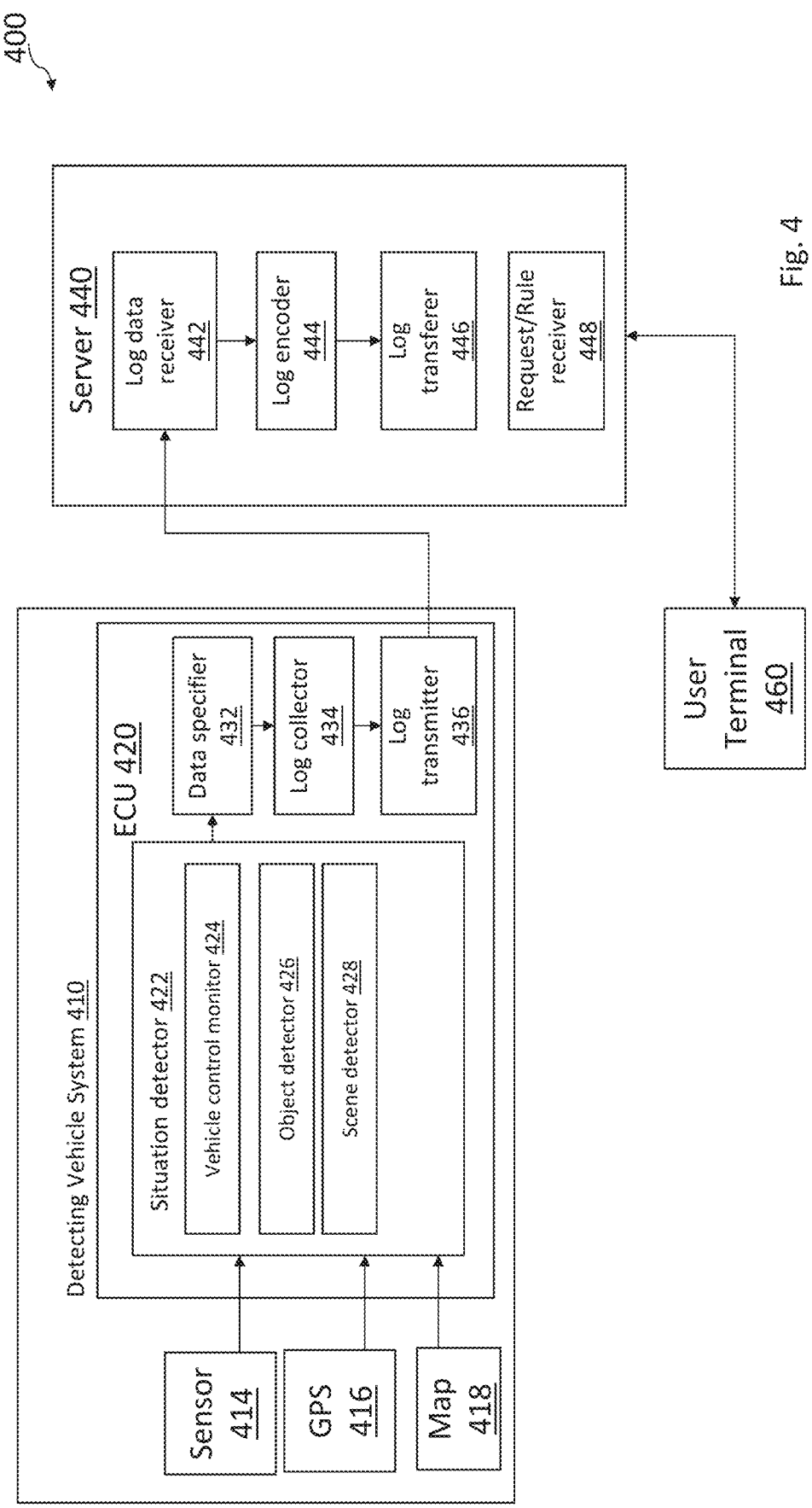
FIG. 4 is a schematic diagram of a request retrieval system in accordance with some embodiments.

FIG. 4 is a block diagram of a request retrieval system 400, in accordance with some embodiments. In some embodiments, the request retrieval system 400 is part of the request retrieval system 100 (FIG. 1). In some embodiments, the request retrieval system 400 is usable in conjunction with the request retrieval system 100 (FIG. 1). In some embodiments, the request retrieval system 400 is separate from the request retrieval system 100 (FIG. 1).

The request retrieval system 400 includes a detecting vehicle system 410 configured to capture information about a vehicle or surroundings of the vehicle. The detecting vehicle system 110 captures information about the vehicle and the surroundings and transmits the information to a server. The request retrieval system 400 further includes a server 440 configured to receive the information, encode the information, and disseminate the information to a user terminal 460.

The detecting vehicle system 410 includes an electronic control unit (ECU) 120 configured to receive data from a sensor 414, a global positioning system (GPS) 416 and a map 416. The ECU 420 includes a situation detector 422, a data specifier 432, a log collector 434 and a log transmitter 436. The situation detector 422 includes a vehicle control monitor 424, an object detector 426, and a scene detector 428.

In some embodiments, the ECU 420 further includes a localization unit configured to receive data from the GPS 416 and the map 418 and determine a position of the vehicle and a pose and state of the vehicle relative to detected and/or known objects and/or road position. A pose is an orientation of the vehicle relative to a reference point, such as a roadway. In some embodiments, the position of the vehicle also refers to a position vector of the vehicle. The pose and state of the vehicle refers to a speed and a heading of the vehicle. In some embodiments, the pose and state of the vehicle also refers to a velocity vector, an acceleration vector and jerk vector of the vehicle. In some embodiments, the position vector, the velocity vector, the acceleration vector, and the jerk vector include angle vector. In some embodiments, the state of the vehicle also refers to whether an engine or motor of the vehicle is running.

The sensor 414 is configured to capture information, such as images, of an environment surrounding the vehicle. In some embodiments, the sensor 414 includes a visible light camera, an IR camera. In some embodiments, the sensor 414 is replaced with or is further accompanied by a light detection and ranging (LiDAR) sensor, a radio detection and ranging (RADAR) sensor, a sound navigation and ranging (SONAR) sensor or another suitable sensor. In some embodiments, the sensor 414 includes additional cameras located at other locations on the vehicle. For example, in some embodiments, additional cameras are located on sides of the vehicle in order to detect a larger portion of the environment to the left and right of the viewing vehicle. Since vehicle occupants are able to look out of side windows of the vehicle, using additional cameras to detect a larger portion of the environment surrounding the vehicle helps to increase precision of detecting objects or scenes surrounding the vehicle. For example, in some embodiments, additional cameras are located on a back side of the vehicle in order to detect a larger portion of the environment to a rear of the vehicle. This information helps to capture information about objects. In some embodiments, the data from the sensor 414 includes a timestamp or other metadata in order to help synchronize the data from the sensor 414 with the data from other components.

The GPS 416 is configured to determine a location of the vehicle. Knowing the location of the viewing vehicle helps to relate an object or scene with determined locations on the map 418.

The map 418 includes information related to the roadway and known objects along the roadway. In some embodiments, the map 418 is usable in conjunction with the GPS 416 to determine a location and a heading of the vehicle. In some embodiments, the map 418 is received from an external device, such as the server 440. In some embodiments, the map 418 is periodically updated based on information from the sensor 414 and/or the GPS 416. In some embodiments, the map 418 is periodically updated based on information received from the external device. In some embodiments, the map 418 is generated from sensor data by simultaneous localization and mapping (SLAM) algorithm. Including the map 418 helps to determine whether an object is a known object. Including the map 118 having known objects helps to increase precision of new object detection.

The situation detector 422 is configured to generate information related to performance of the vehicle and of systems within the vehicle. The situation detector 422 is able to collect information from components within the vehicle, such as the sensor 414, braking systems, acceleration system, and other suitable components. Utilizing this information, the situation detector 422 is able to determine performance of the vehicle. In some embodiments, the situation detector 422 is further configured to monitor performance of software and networking operations within the vehicle. For example, in some embodiments, the situation detector 422 is configured to receive information related to "crashing" of software or applications within the vehicle. In some embodiments, the situation detector 422 is configured to collect information regarding a storage capacity of a memory device within the vehicle. In some embodiments, the situation detector 422 is configured to receive information related to a processing capability of a processor within the vehicle.

The vehicle control monitor 424 is configured to receive sensor data and control logs related to current operation of the vehicle. In some embodiments, the sensor data includes information related to vehicle speed, acceleration, jerk, braking, steering, pitching, rolling, yawing, blinking hazard lamp, horn beeping, or other suitable information. The vehicle control monitor 424 is configured to determine whether any of the received sensor data indicates the satisfaction of a criteria for fulfilling a request, e.g., a trigger event was detected.

The object detector 426 is configured to receive sensor data from the sensor 414 to determine whether any abnormal objects are located in the roadway. In some embodiments, the object detector 426 is further configured to determine whether any objects are present along or adjacent to the roadway. In some embodiments, the sensor data from the sensor 414 includes an image and the object detector 426 is configured to perform image recognition on the received image, e.g., using a trained neural network, to identify abnormal objects. In some embodiments, the object detector 426 is configured to compare any identified objects with information from the GPS 416 and the map 418 to help determine a type of an identified object. In some embodiments, the object detector 426 is configured to identify objects, e.g., a tire, a car part, etc., an animal, a pothole, a traffic regulation board, an emergency vehicle, a vehicle with hazard lights active, or other suitable objects as objects.

The scene detector 428 is configured to receive the sensor data from the sensor 414 to determine whether any scenes are located in an environment surrounding the vehicle that satisfy a condition for fulfilling a request. In some embodiments, the scene detector 428 is configured to determine that a vehicle accident has occurred in response to detecting that two or more vehicles are in contact with one another or that a vehicle is surrounded by multiple fallen objects. In some embodiments, the scene detector 428 is configured to determine that construction is occurring based on detecting multiple construction vehicles in close proximity. In some embodiments, the scene detector 428 is configured to determine that a vehicle is parked on a shoulder of the roadway based on determining that a vehicle is located adjacent to the roadway and is not moving or is moving significantly slower than other vehicles. In some embodiments, the scene detector 428 is configured to use image recognition, such as through a trained neural network, to determine contents of a scene surrounding the vehicle.

In some embodiments, each of the object detector 426 and the scene detector 428 are active during an entire period of operation of the vehicle, e.g., when an engine or motor of the vehicle is running. In some embodiments, at least one of the object detector 426 or the scene detector 428 is activated in response to the vehicle control monitor 424 determining that a specific behavior, e.g., trigger event, was detected.

In some embodiments, the ECU 420 further includes a capacity planner. In some embodiments, the capacity planner is configured to monitor whether the detecting vehicle system 410 is capable of satisfying a received rule. In some embodiments, the ECU 420 further includes a rule updater. In some embodiments, the rule updater is configured to update a rule in response to a sensor becoming disabled that would prevent satisfying of the rule. In some embodiments, the rule updater is configured to generate a recommendation for a user of the rule based on available functionality within the detecting vehicle system 410.

The data specifier 432 is configured to receive a determination that a fulfillment of a request was performed or that a trigger event was detected. The data specifier 432 is configured to analyze the received information to determine what sensor data from the sensor 414 should be collected based on the received data. For example, in some embodiments where an abnormal steering behavior by the driver is detected, the data specifier 432 is configured to determine that image data from a front camera of the sensor 414 should be captured. Further, the data specifier 432 is configured to determine a time period over which the data from the determine sensor should be collected based on a time of the detected situation. In some embodiments, the data specifier 432 is configured to determine the sensor 414 from which to collect data based on instructions in a received request from user.

In some embodiments, the data specifier 432 is configured to determine a region of the received sensor data that is relevant to the detected situation. In some embodiments, the region of the received sensor data is identified based on object recognition performed on the sensor data, e.g., by the object detector 426 or the scene detector 428. In some embodiments, the data specifier 432 is configured to crop a received image from the sensor data or remove extraneous data from the sensor data if the sensor data is not an image to reduce an amount of information in a log of the abnormal situation. In some embodiments, the data specifier 432 is configured to remove personal information such as license plate, human faces, etc. from the sensor data.

The log collector 434 is configured to receive data from the data specifier 432. In some embodiments, the log collector 434 is configured to receive data directly from the sensor 414, the GPS 416, or the situation detector 422 based on information provided by the data specifier 432. The log collector 434 is also configured to determine what information is useful for identifying the type and location of the object, such as location information from the GPS 416 or the map 418, image information from the sensor 414, cropped or reduced information from the data specifier 432, timestamp information related to a time the object or scene was detected, or other suitable information.

The log collector 434 generates log data based on the received and correlated data, such as the cropped image and location data. The log collector 434 also associates timestamp information with the log data in order to assist with synchronization of the collected data and for queue priority within the server 440. In some embodiments, the log collector 434 generates the log data to further include world coordinates associated with the cropped image. In some embodiments, the log collector 434 generates the log data to further include a map location associated with the cropped image. In some embodiments, the log collector 434 includes additional information to assist in increasing accuracy of determining the object or scene.

While the above description relates to generating log data based on an image from the sensor 414, one of ordinary skill in the art would understand that the log collector 434 is not limited solely to generating log data based on images. In some embodiments, the log collector 434 is configured to generate log data based on information from other sensors attached to the vehicle, such as RADAR, LIDAR, or other suitable sensors. In some embodiments where the occupant is wearing smart glasses, the log collector 434 is further configured to generate the log data based on information received from the smart glasses.

The log transmitter 436 is configured to receive log data from the log collector 434 and transmit the log data to the server 440. In some embodiments, the log transmitter 436 is configured to transmit the log data wirelessly. In some embodiments, the log transmitter 436 is configured to transmit the log data via a wired connection. In some embodiments, the log transmitter 436 is configured to transmit the log data to the user terminal 460 directly. In some embodiments, the log transmitter 436 is configured to transmit the log data to a mobile device accessible by the user, which in turn is configured to transmit the log data to the server 440. In some embodiments, the log transmitter 436 is configured to transmit the log data to the mobile device using Bluetooth® or another suitable wireless technology. In some embodiments, the ECU 420 is configured to determine whether the data transfer rate from the mobile device to the server 440 is higher than a transfer rate from the log transmitter 436 to the server 440. In response to a determination that the data transfer rate from the mobile device to the sever 440 is higher, the log transmitter 436 is configured to transmit the log data to the mobile device to be transmitted to the server 440. In response to a determination that the data transfer rate from the mobile device to the server 440 is not higher, the log transmitter 436 is configured to transmit the log data to the server 440 from the vehicle system 410 directly without transferring the log data to the mobile device.

In some embodiments, the detecting vehicle system 410 further includes a memory configured to store sensor data from sensors attached to the vehicle. In some embodiments, the memory is further configured to store information associated with previously detected objects or scenes. In some embodiments, in response to detecting an object or scene that matches a previous object or scene, the data specifier 434 is configured to provide results based on the matching object or scene. In some embodiments, the detecting vehicle system 410 is further configured to determine whether the detecting vehicle has received from the server 440 information related to an object or scene that matches the determined object or scene from the situation detector 422. In some embodiments, in response to determining that the detecting vehicle has already received information related to the determined object or scene, the detecting vehicle system 410 is configured to prevent transmission of the log data to the server 440. Avoiding transmission of redundant information to the server 440 helps to reduce data transmitted to the server 440 and helps to minimize power consumption by the detecting vehicle system 410. In some embodiment, the storing of the previous requests is called caching. One of ordinary skill in the art would understand caching as using hardware or software to store data so that future requests for that data are able to be served faster.

The server 440 includes a log data receiver 442 configured to receive the log data from the log transmitter 436. In some embodiments, the log data receiver 442 is configured to receive the log data from the mobile device. The server 440 further includes a log encoder 444 configured to encode the log data. The server 440 further includes a log transferer 446 configured to transmit the encoded log data to the user terminal 160. The server 440 further includes a request/rule receiver 448 configured to receive a request or a rule from the user terminal 460.

The log data receiver 442 is configured to receive the log data from the log transmitter 436. In some embodiments, the log data receiver 442 is configured to receive the log data from the mobile device. In some embodiments, the log data receiver 442 is configured to receive the log data wirelessly.

In some embodiments, the log data receiver 442 is configured to receive the log data via a wired connection. In some embodiments, the log data receiver 442 is configured to attach a timestamp for a time that the log data was received to the log data.

The log encoder 444 is configured to encode the received log data according to a predetermined encoding protocol. Encoding the log data according to a predetermined encoding protocol helps to ensure that the user terminal 460 is able to reliably decode the log data for use by the user terminal 460. In some embodiments, the log encoder 444 is configured to perform compression of the log data, image encoding, thumbnail image creation, or other suitable encoding protocols. In some embodiments, the log encoder 444 is configured to perform encryption of the log data. In some embodiments, the log encoder 444 is further configured to perform super-resolution to make the data more visible for the user. One of ordinary skill in the art would understand that super-resolution is a process of receiving a high-resolution image from a low-resolution image. Improving the resolution of the log data helps to reduce false positives or false negatives.

In some embodiments, the server 440 further includes a database for storing received log data. In some embodiments, the log data is stored in the database prior to and/or after encoding by the log encoder 444. In some embodiments, the log data is stored in the database in a priority queue. In some embodiments, the priority of the priority queue is determined based on a time that the object or scene, e.g., a trigger event, was detected, a time that the log data was received by the log data receiver 442, a type of the object or scene, an identity of the driver of the detecting vehicle, or other suitable priority criteria.

The log transferer 446 is configured to receive the encoded log data from the log encoder 444. The log transferer 446 is configured to transmit the encoded to the user terminal 460. In some embodiments, the log transferer 446 is configured to transmit the encoded log data to a mobile device accessible by the user. In some embodiments, the log transferer 446 is configured to transfer the encoded log data wirelessly. In some embodiments, the log transferer 446 is configured to transmit the encoded log data via a wired connection. In some embodiments, the log transferer 446 is configured to transmit encoding protocol information along with the encoded log data. Transmitting the encoding protocol information for the encoded log data helps the mobile device or the user terminal 460 to accurately decode the encoded log data for use by the user terminal 460.

The request/rule receiver 448 is configured to receive new or updated rules or requests for data from a user. In some embodiments, the request/rule receiver 448 is configured to receive the new or updated rules or requests wirelessly. In some embodiments, the request/rule receiver 448 is configured to receive the new or updated rules or request via a wired connection. In some embodiments, the request/rule receiver 448 from the UI 110 (FIG. 1).

In some embodiments, the server 440 is configured to receive location in formation from multiple vehicles. In some embodiments, the server 440 is configured to receive navigation plans from multiple vehicles. In some embodiments, the log transferer 446 is configured to limit the transmission of encoded log data to only vehicles that are within a predetermined distance of the detected trigger event.

In some embodiments, the server 440 is configured to transmit only log data associated with a newly detected trigger event. That is, if the trigger event has already been reported by the server 440, the trigger event is not reported again. Limiting the repetitive reporting of trigger event helps to reduce redundant data received by user terminals to the server 440.

The user terminal 460 is a user terminal accessible by a user associated with a fulfilled request. In some embodiments, the user terminal 460 includes a GUI. In some embodiments, the user terminal 460 is configured to automatically generate an alert in response to received data from the server 440. In some embodiments, the alert includes an audio or visual alert.

One of ordinary skill in the art would understand that modifications to the request retrieval system 400 are within the scope of this disclosure. For example, in some embodiments, the detecting vehicle system 410 is able to transmit log data directly to the user terminal 460 over a network, such as a wireless network. In some embodiments, a mobile device of an occupant in the detecting vehicle is able to transmit log data directly to the user terminal 460, such as a wireless network.

By automatically identifying and disseminating information related to satisfaction of rule or requests detected within the vehicle or in an environment surrounding a vehicle, the user is able to improve performance of applications or software executed using a processing system of the vehicle, e.g., the ECU 420. In some embodiments, the user is able to object information related to events such as accidents.

Figure 5:
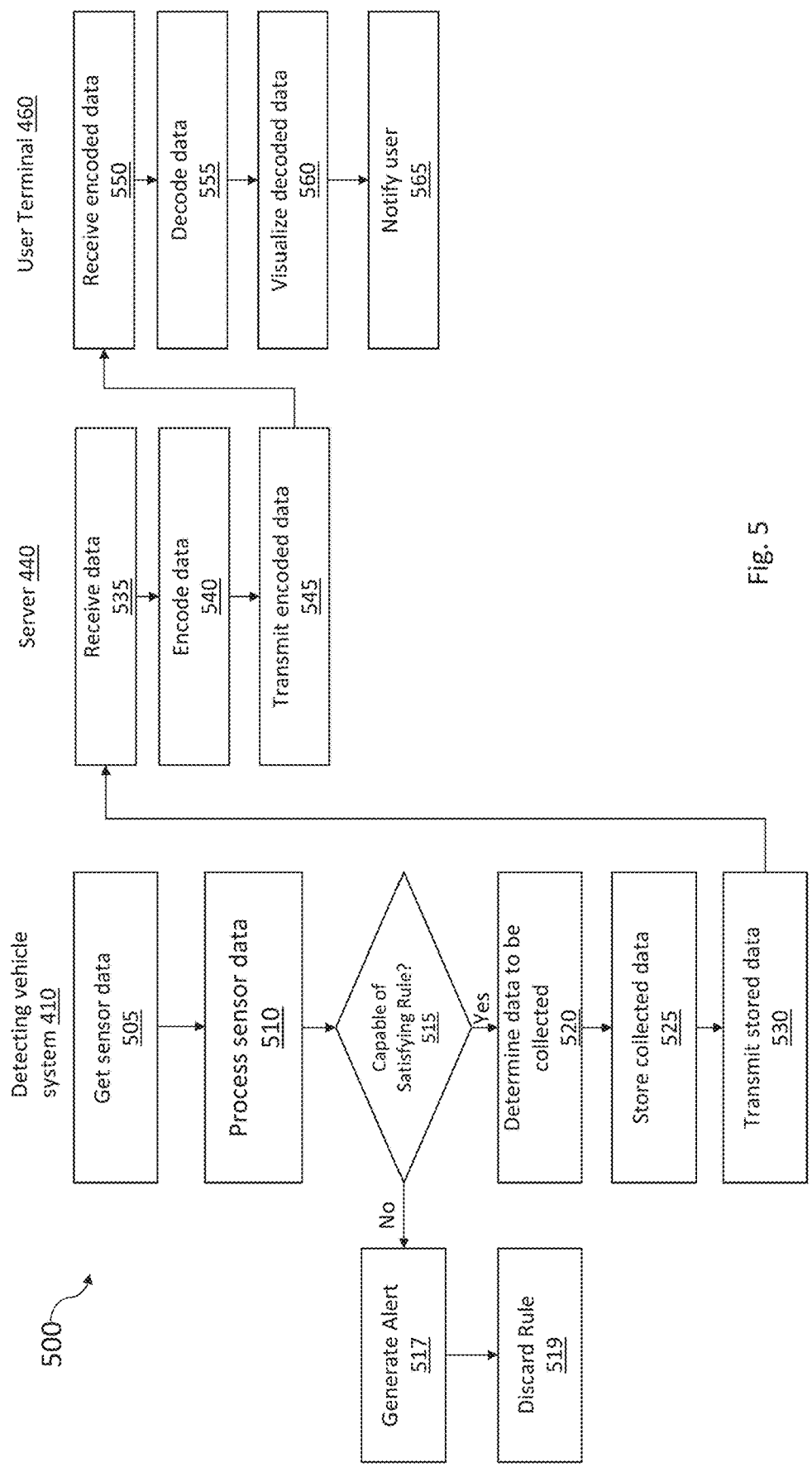
FIG. 5 is a flowchart of a method of implementing a request retrieval system in accordance with some embodiments.

FIG. 5 is a flowchart of a method 500 of implementing a request retrieval system in accordance with some embodiments. In some embodiments, the method 500 is implemented using the request retrieval system 100 (FIG. 1) or the request retrieval system 400 (FIG. 4). In some embodiments, the method 700 is implemented using the request retrieval system 700 (FIG. 7). In some embodiments, the method 500 is implemented using a system other than request retrieval system 100 (FIG. 1), request retrieval system 400 (FIG. 4) or request retrieval system 700 (FIG. 7). The following description relates to processing of a rule or request received by a vehicle.

In operation 505, sensor data is collected. The sensor data is collected by one or more sensors connectable to the vehicle. In some embodiments, the sensor data includes control parameters of the vehicle. In some embodiments, the sensor data includes information related to an environment surrounding the vehicle. In some embodiments, the sensor data includes data from the sensor 414 (FIG. 4) and/or other sensors in the vehicle.

In operation 510, the sensor data is processed. The sensor data is processed to identify one or more trigger events related to one or more rules stored in a memory of the vehicle. In some embodiments, the sensor data is processed by the situation detector 422 (FIG. 4). In some embodiments, the sensor data is processed based on pre-processing instructions related to one or more rules stored in the memory in the vehicle. In some embodiments, the sensor data is processed to remove sensor data for privacy concerns. In some embodiments, the sensor data is processed to compress the sensor data for storage in the vehicle memory.

In operation 515, a determination is made regarding whether the vehicle system is capable of completely satisfying the rule. The determination is made based on the presence of one or more sensors within the vehicle, an operating status of the one or more sensors in the vehicle, processing capacity, memory capacity, processing abilities, access to the one or more sensors in the vehicle, or other suitable criteria. In some embodiments, the operation 515 determines that the vehicle system is not capable of satisfying the rule in response to the rule requesting data from a sensor that is no present in the vehicle. In some embodiments, the operation 515 determines that the vehicle system is not capable of satisfying the rule in response to the rule requesting data from a sensor that is present in the vehicle, but not functioning properly. In some embodiments, the operation 515 determines that the vehicle system is not capable of satisfying the rule in response to the rule requesting data processing beyond the processing capacity of the vehicle system. In some embodiments, the operation 515 determines that the vehicle system is not capable of satisfying the rule in response to the rule requesting storage of data beyond a capacity of the vehicle system. In some embodiments, the operation 515 determines that the vehicle system is not capable of satisfying the rule in response to the rule requesting the vehicle system to perform a processing of collected data beyond an ability of the vehicle system, e.g., encoding of data using an encoding protocol that is not installed on the vehicle system. In some embodiments, the operation 515 determines that the vehicle system is not capable of satisfying the rule in response to the rule requesting data from a sensor that the user associated with the rule is not permitted to access.

The determination reviews the data collection request associated with the rule and determines whether the vehicle system, e.g., the vehicle detecting system 410 (FIG. 4), is capable of satisfying every aspect of the data collection request. If the vehicle system is unable to satisfy any single component of the data collection request for the rule, then the operation 515 determines that the vehicle system is not capable of satisfying the rule. For example, in some embodiments, the rule requests data from an optical camera for a duration of 15 seconds and the data to be encoded using a first encoding protocol. If the optical camera is in the vehicle and functioning properly; and the memory capacity of the vehicle is capable of storing 15 seconds of data, but the processor is not able to perform the first encoding protocol, the vehicle system is determined as incapable of satisfying the rule.

In some embodiments, the determination of whether the vehicle system is capable of satisfying the rule is based on whether the vehicle system is capable of detecting criteria for a trigger event associated with the rule. If the vehicle system is not capable of detecting whether the trigger event associated with the rule has occurred, then the vehicle system will not be able to successful launch the rule and will therefore never satisfy the rule. For example, in some embodiments, the trigger event includes a sudden change in acceleration but the vehicle is not equipped with an accelerometer, a gyroscope, or other suitable acceleration detecting sensor. In such a situation, the vehicle system would not be able to reliably determine sudden change in acceleration; and the vehicle system would be unable to satisfy the rule.

In some embodiments, the determination of whether the vehicle system is capable of satisfying the rule is based on an identity of a user associated with the rule. In some embodiments, a data from one or more sensor in the vehicle is restricted to prohibit a certain user or a certain user type from accessing the one or more sensor. In some embodiments, the restriction is imposed by the owner of the vehicle. For example, in some embodiments, the owner of the vehicle is able to decide whether to share information with one or more third parties. If the user that created the rule is one of the third parties that the owner decided not to share information, then the operation 515 will determine that the vehicle system cannot satisfy the rule. In some embodiments, the restriction is imposed by a manufacturer. For example, in some embodiments, access to sensors or data related to safety of the vehicle is restricted by the manufacturer.

In some embodiments, access to one or more sensors in the vehicle is permitted based on a surcharge payable by the user associated with the rule. In some embodiments, the user is able to pay a surcharge in order to access a specific sensor in the vehicle. In some embodiments, the surcharge is paid at creation of the rule, in response to receipt of data requested by the rule, or in another suitable situation. In some embodiments, the user is able to pay a surcharge for usage of a certain amount of memory or processing capacity of the vehicle system. In response to the user failing to pay the surcharge for access to the sensor, memory resources, processing resources, or other aspect of data collection associated with the rule, the operation 515 determines that the vehicle is unable to satisfy the rule.

In some embodiments, the owner of the vehicle or the manufacturer of the vehicle is able to permit limited access to one or more sensors in the vehicle, or to other data collection abilities of the vehicle. In some embodiments, the limited access includes a one-time permission from the owner or the manufacturer. In some embodiments, the limited access is granted in response to authorization by the owner by interacting with an interface, such as a GUI in the vehicle, of the vehicle. In some embodiments, the authorization by the owner is provided by interacting with a mobile device in communication with the vehicle. In some embodiments, a request for limited access is automatically displayed on the interface of the vehicle or the mobile device in response to detection of a trigger event associated with the rule. In some embodiments, the limited access is granted by the manufacturer in response to a suitable request from police, government officials, insurance company, or other suitable users.

Determining whether the vehicle system is capable of satisfying the rule helps to improve efficiency in the use of the vehicle system. The vehicle system has a finite amount of resources, so executing portions of a rule that the vehicle system cannot fully satisfy will consume resources of the vehicle system with no ability to provide the requested data. As a result, a risk that another rule is not processed increases, which limits value derived from the ability to collect requested data from the vehicle system.

In response to a determination that the vehicle system is incapable of satisfying the rule, the method 500 proceeds to operation 517. In response to a determination that the vehicle is capable of satisfying the rule, the method 500 proceeds to operation 520.

In operation 517, an alert is generated indicating that the vehicle system is not capable of satisfying the rule. In some embodiments, the alert includes an audio alert or a visual alert. In some embodiments, the vehicle system 410 is configured to transmit the alert to the user, e.g., using the accessible console 150 (FIG. 1), the UI 110 (FIG. 1), or another suitable device. In some embodiments, the alert includes instructions for causing the device that receives the alert to automatically display the alert. In some embodiments, the alert includes information indicating why the vehicle system is not capable of satisfying the rule. For example, in some embodiments where the sensor is not functioning properly, the alert indicates that the sensor requested by the rule is not functioning properly. In some embodiments, the alert includes information indicating potential alternatives for data collection by the rule that are supported by the vehicle. For example, in some embodiments, the alert includes information indicating alternative encoding options that the processor of the vehicle system is able to perform. In some embodiments, the alert includes information indicating a surcharge request for the user in order to allow the vehicle system to satisfy the rule. For example, in some embodiments, access the sensor requested by the rule is limited based on payment of a surcharge and the alert indicates a fee requested for accessing the sensor. In some embodiments, the alert is transmitted wirelessly. In some embodiments, the alert is transmitted via a wired connection. One of ordinary skill in the art would recognize that additional variations for the alert are within the scope of this description and that the above examples are merely exemplary.

The generation of the alert helps with allowing the user to determine whether to adjust data collection requests for a rule based on the type of information that the user is able to obtain from the vehicle system. The alert helps to avoid a situation where the user is unaware that the rule that was created is not being implemented by the vehicle system.

In some embodiments, the operation 517 is omitted where the vehicle system does not alert the user to the inability to satisfy the rule. In such embodiments, the method 500 proceeds from operation 515 to operation 519 in response to a determination that the vehicle system is incapable of satisfying the rule.

In operation 519, the rule is discarded. The rule is discarded by removing the rule from the memory of the vehicle system. In some embodiments, the rule is erased from the memory of the vehicle system. In some embodiments, the memory of the vehicle system permits overwriting of the rule. The discarding of the rule helps to increase memory capacity within the vehicle system for receiving and implementing additional rules that the vehicle system is capable of satisfying.

In operation 520, a determination is made regarding what sensor information should be collected based on the rule. The rule stored in the memory of the vehicle includes information related to types of sensor data and time periods for sensor data to be collected. In some embodiments, the collected data is cropped or processed to reduce or remove extraneous data.

In operation 525, the collected data is stored. In some embodiments, the collected data is stored in a memory. In some embodiments, the collected data is stored in association with timestamp information related to when the data was collected or when the trigger event was. In some embodiments, the collected data is stored using a log collector 434 (FIG. 4).

In operation 530, the stored data is transmitted to the server 440. In some embodiments, the stored data is transmitted wirelessly. In some embodiments, the stored data is transmitted via a wired connection. In some embodiments, the stored data is transmitted using the log transmitter 436 (FIG. 4).

In operation 535, the transmitted data is received by the server 440. In some embodiments, the data is received by the log data receiver 442 (FIG. 4). In some embodiments, the received data is stored in a memory on the server 440. In some embodiments, the received data is stored in a prioritized queue on the server 440.

In operation 540, the received data is encoded. In some embodiments, the received data is encoded according to a predetermined encoding protocol. In some embodiments, the received data is encoded according to criteria determined by the rule associated with the received data. In some embodiments, the received data is encoded based on a type of data received. In some embodiments, the data is encoded according to a priority of the data in a prioritized queue. In some embodiments, the encoded data is stored in a memory on the server 440. In some embodiments, the encoded data is stored in the memory in a prioritized queue on the server 440. In some embodiments, the operation 540 is omitted and the received data is not encoded.

In operation 545, the encoded data is transmitted to the user terminal 460. In some embodiments, the encoded data is transmitted wirelessly. In some embodiments, the encoded data is transmitted via a wired connection. In some embodiments, the encoded data is transmitted according to a priority of the encoded data in a prioritized queue. In some embodiments, the encoded data is transmitted by the log transferer 446 (FIG. 4).

In operation 550, the encoded data is received. In some embodiments, the encoded data is received by the user terminal 460 (FIG. 4). In some embodiments, the received data is stored in a memory on the user terminal 460 (FIG. 4) prior to decoding. In some embodiments, the received data is stored in a prioritized queue on the user terminal 460 (FIG. 4).

In operation 555, the data is decoded. In some embodiments, the data is decoded according to a predetermined decoding protocol. In some embodiments, the data is decoded based on encoding protocol information received with the data from the server 440. In some embodiments, the data is decoded according to a type of data received. In some embodiments, the data is decoded based on a priority in the prioritized queue. In some embodiments, the decoded data is stored in the memory in the user terminal 460 (FIG. 4). In some embodiments, the decoded data is stored in the memory in the user terminal 460 (FIG. 4) in a prioritized queue.

In operation 560, the decoded data is visualized. Visualizing the decoded data provides a visual representation of the data. In some embodiments, the visual representation includes an image of the data from the vehicle. In some embodiments, the visual representation includes an icon representing the data from the vehicle. In some embodiments, the visual representation includes a table of data. In some embodiments, the visual representation includes text, such as JSON text. In some embodiments, the visual representation includes a location of the detected trigger event on a map. In some embodiments, the decoded data is visualized using the user terminal 460 (FIG. 4).

In operation 465, the user is notified about the visualized data. In some embodiments, the user is notified using a UI, e.g., UI 110 (FIG. 1). In some embodiments, the user is notified using a mobile device accessible by the occupant. In some embodiments, the notification includes an audio or visual alert. In some embodiments, the notification is configured to automatically generate an alert on the mobile device accessible by the user.

One of ordinary skill in the art would understand that modifications to the method 500 are within the scope of this description. In some embodiments, at least one additional operation is included in the method 500. For example, in some embodiments the method 500 further includes receiving a confirmation of the trigger event from an occupant of the vehicle. In some embodiments, at least one operation of the method 500 is excluded. For example, in some embodiments, the operation 540 is excluded and the data is provided to the user terminal 460 without encoding the data. In some embodiments, an order of operation of the method 500 is adjusted. For example, in some embodiments, operation 525 occurs prior to a determination regarding whether the trigger event is detected to help preserve sensor data. One of ordinary skill in the art would understand that other modifications to the method 500 are within the scope of this description.

Figure 6A:
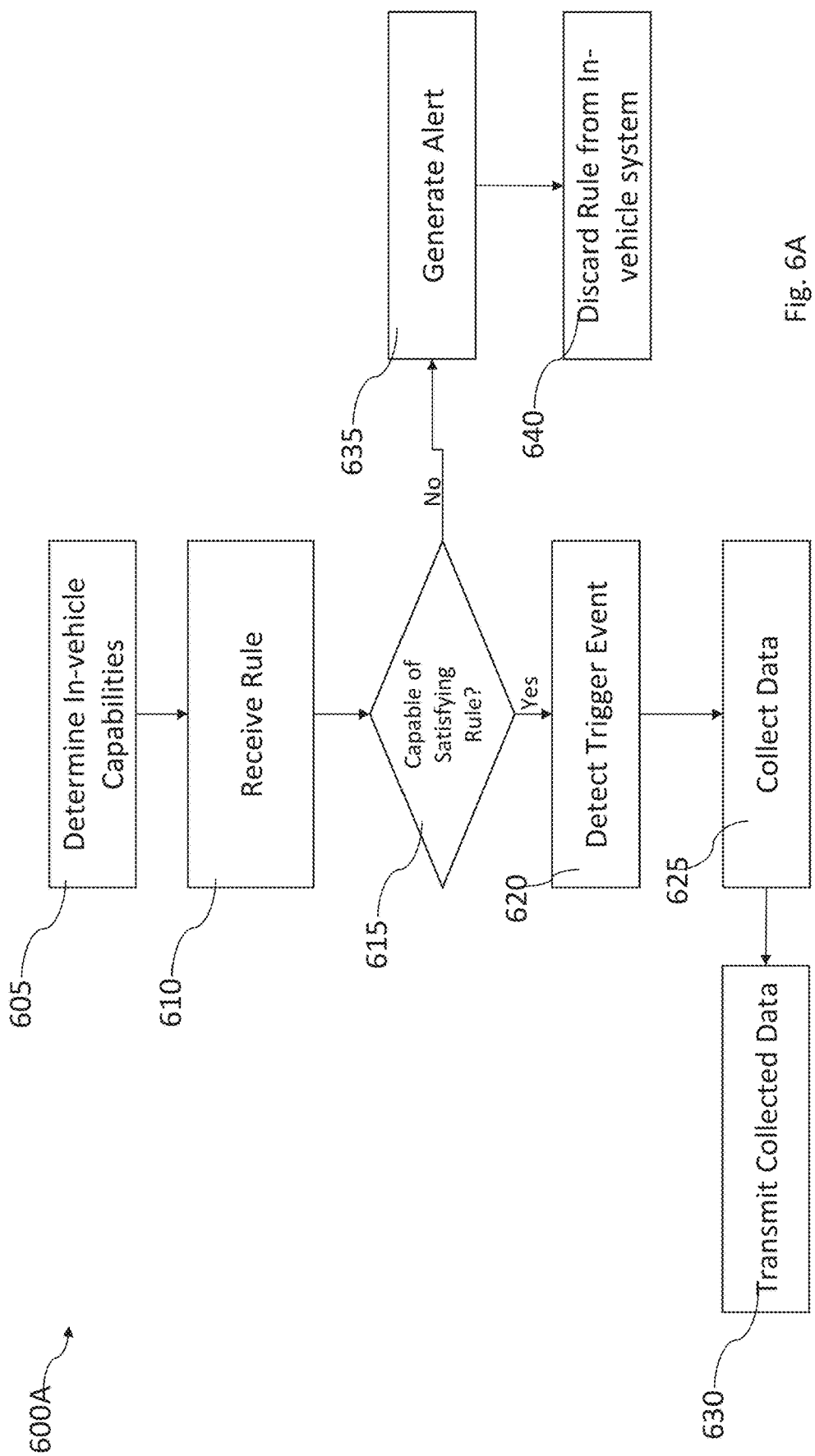
FIG. 6A is a flowchart of method of collecting data using an in-vehicle system in accordance with some embodiments.

FIG. 6A is a flowchart of method 600A of collecting data using an in-vehicle system in accordance with some embodiments. In some embodiments, the method 600A is implemented by one or more operations of the method 500 (FIG. 5). In some embodiments, the method 600A is implemented by the situation detector 422 (FIG. 4). In some embodiments, the method 600A is implemented using the request retrieval system 100 (FIG. 1) or the request retrieval system 400 (FIG. 4). In some embodiments, the method 600A is implemented using a system other than the request retrieval system 100 (FIG. 1) or the request retrieval system 400 (FIG. 4). The method 600A is usable to determine whether a vehicle system is capable of satisfying a received rule.

In operation 605, in-vehicle capabilities of the vehicle system are determined. Determining the in-vehicle capabilities includes determining which sensors are present in the vehicle, memory capacity of the vehicle system, processing capacity of the vehicle system, processing abilities of the vehicle system, operational status of the sensors in the vehicle system or other suitable determinations. In some embodiments, capacity and abilities of components of the vehicle system or presence of sensors in the vehicle is determined based on data stored in a memory or database within the vehicle. In some embodiments, determining operational status of sensors within the vehicle is performed by queries sent to each of the sensors present in the vehicle. In some embodiments, the operation 605 is performed periodically, e.g., once a day, once an hour, or another suitable periodic duration. In some embodiments, the operation 605 is performed each time the vehicle is started, e.g., starting of an engine or a motor in the vehicle. In some embodiments, the operation 605 is performed in response to receiving a new rule. In some embodiments, the operation 605 is performed in response to failure to satisfy a rule following detection of a trigger event associated with the rule.

In operation 610, a rule is received. The rule includes a data collection request and a trigger event. In some embodiments, the rule includes an identity of a user that created the rule. In some embodiments, the rule includes a requested encoding protocol. In some embodiments, the rule includes information related to a fee paid by the user. In some embodiments, the rule includes information related to an authorization level of the user that created the rule. In some embodiments, the rule is received wirelessly. In some embodiments, the rule is received via a wired connection.

In operation 615, a determination is made regarding whether the vehicle system is capable of satisfying the rule. The determination is made based on the data collection request and a trigger event of the received rule from operation 610. In some embodiments, the determination is made based on an identity of the user that created the rule, an authorization level of the user that created the rule, a fee paid by the user that created the rule or other suitable criteria. In some embodiments, the operation 615 is similar to the operation 515 (FIG. 5), and detailed discussion of the operation 615 is omitted for the sake of brevity.

Determining whether the vehicle system is capable of satisfying the rule helps to improve efficiency in the use of the vehicle system. The vehicle system has a finite amount of resources, so executing portions of a rule that the vehicle system cannot fully satisfy will consume resources of the vehicle system with no ability to provide the requested data. As a result, a risk that another rule is not processed increases, which limits value derived from the ability to collect requested data from the vehicle system.

In response to a determination that the vehicle system is incapable of satisfying the rule, the method 600A proceeds to operation 635. In response to a determination that the vehicle is capable of satisfying the rule, the method 600A proceeds to operation 620.

In operation 620, one or more trigger event is detected. The trigger event is detected based on a comparison between data collected by sensors attached to the vehicle and information stored with respect to rules in the memory of the vehicle. That is, the rule includes information indicating the conditions under which data should be collected, i.e., a trigger event. In some embodiments, the data is collected by sensor 414 (FIG. 4).

In operation 625, data is collected based on data collection requests for the rules associated with the detected trigger event from operation 620. In some embodiments, the data collection is performed based on a priority level of the rules. Rules with a higher priority level are attempted to be launched for data collection before attempting to launch rules with lower priority levels. In some embodiments, the operation 625 launches multiple rules. In some embodiments, the operation 625 launches a single rule. The collected data is stored, at least temporarily, in an in-vehicle memory. In some embodiments, the collected data is processed, such as encoding, removing privacy information, or other suitable processing, prior to storage in the in-vehicle memory.

In operation 630, the collected data is transmitted to a server, e.g., server 440 (FIG. 4) or a user terminal, e.g., user terminal 460 (FIG. 4). In some embodiments, the stored data is transmitted wirelessly. In some embodiments, the stored data is transmitted via a wired connection. In some embodiments, the stored data is transmitted using the log transmitter 436 (FIG. 4).

In operation 635, an alert is generated indicating that the vehicle system is not capable of satisfying the rule. In some embodiments, the alert includes an audio alert or a visual alert. In some embodiments, the vehicle system 410 is configured to transmit the alert to the user, e.g., using the accessible console 150 (FIG. 1), the UI 110 (FIG. 1), or another suitable device. In some embodiments, the operation 635 is similar to the operation 517 (FIG. 5) and a detailed description of the operation 635 is omitted for the sake of brevity.

The generation of the alert helps with allowing the user to determine whether to adjust data collection requests for a rule based on the type of information that the user is able to obtain from the vehicle system. The alert helps to avoid a situation where the user is unaware that the rule that was created is not being implemented by the vehicle system.

In some embodiments, the operation 635 is omitted where the vehicle system does not alert the user to the inability to satisfy the rule. In such embodiments, the method 600A proceeds from operation 615 to operation 640 in response to a determination that the vehicle system is incapable of satisfying the rule.

In operation 640, the rule is discarded from the in-vehicle system. The rule is discarded by removing the rule from the memory of the vehicle system. In some embodiments, the rule is erased from the memory of the vehicle system. In some embodiments, the memory of the vehicle system permits overwriting of the rule. The discarding of the rule helps to increase memory capacity within the vehicle system for receiving and implementing additional rules that the vehicle system is capable of satisfying.

One of ordinary skill in the art would understand that modifications to the method 600A are within the scope of this description. In some embodiments, at least one additional operation is included in the method 600A. For example, in some embodiments the method 600A further includes transmitting a notification to the user terminal, e.g., user terminal 460 (FIG. 4), that the trigger event was detected. In some embodiments, at least one operation of the method 600A is excluded. For example, in some embodiments, the operation 635 is excluded in situations where no alert is to be generated. In some embodiments, an order of operation of the method 600A is adjusted. For example, in some embodiments, operation 610 occurs prior to the operation 605. One of ordinary skill in the art would understand that other modifications to the method 600A are within the scope of this description.

Figure 6B:
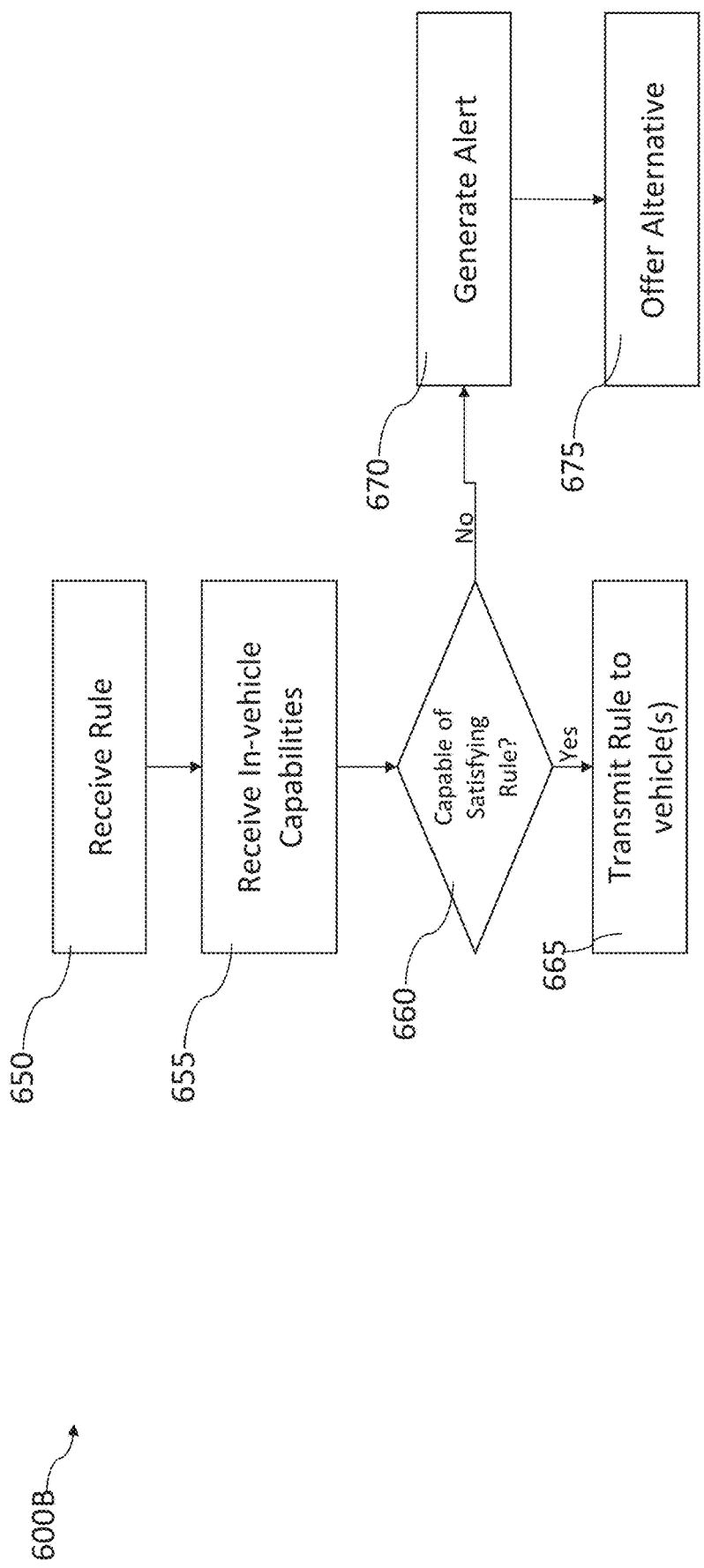
FIG. 6B is a flowchart of method of collecting data using an in-vehicle system in accordance with some embodiments.

FIG. 6B is a flowchart of method 600B of collecting data using an in-vehicle system in accordance with some embodiments. In some embodiments, the method 600B is implemented by one or more operations of the method 500 (FIG. 5). In some embodiments, the method 600B is implemented by the server 440 (FIG. 4). In some embodiments, the method 600B is implemented using the request retrieval system 100 (FIG. 1) or the request retrieval system 400 (FIG. 4). In some embodiments, the method 600B is implemented using a system other than the request retrieval system 100 (FIG. 1) or the request retrieval system 400 (FIG. 4). The method 600B is usable to determine whether a vehicle system is capable of satisfying a received rule. In contrast to the method 600A (FIG. 6A), the method 600B is usable to prevent transmission of a rule to a vehicle that is incapable of satisfying the rule. By preventing transmission of the rule to a vehicle that is incapable of satisfying the rule, the method 600B helps to further improve efficiency of use of in-vehicle resources by reducing or avoid analysis of the rule by the vehicle system to determine whether the vehicle system is capable of satisfying the rule.

In operation 650, a rule is received. The rule includes a data collection request and a trigger event. In some embodiments, the rule includes an identity of a user that created the rule. In some embodiments, the rule includes a requested encoding protocol. In some embodiments, the rule includes information related to a fee paid by the user. In some embodiments, the rule includes information related to an authorization level of the user that created the rule. In some embodiments, the rule is received from UI 110 (FIG. 1). In some embodiments, the rule is received from user terminal 460 (FIG. 4). In some embodiments, the rule is received wirelessly. In some embodiments, the rule is received via a wired connection.

In operation 655, in-vehicle capabilities of the vehicle system are received. The in-vehicle capabilities includes determining which sensors are present in the vehicle, memory capacity of the vehicle system, processing capacity of the vehicle system, processing abilities of the vehicle system, operational status of the sensors in the vehicle system or other suitable determinations. In some embodiments, capacity and abilities of components of the vehicle system or presence of sensors in the vehicle is determined based on data stored in a database related to the capabilities of the vehicle. In some embodiments, determining operational status of sensors within the vehicle is periodically updated based on information received from the vehicle related to operational status of components of the vehicle. In some embodiments, the operation 655 is performed periodically, e.g., once a day, once an hour, or another suitable periodic duration. In some embodiments, the operation 655 is performed each time the vehicle is started, e.g., starting of an engine or a motor in the vehicle. In some embodiments, a request for vehicle capabilities is sent to the vehicle in response to receiving the rule in operation 650 that requests data from the vehicle.

In operation 660, a determination is made regarding whether the vehicle system is capable of satisfying the rule. The determination is made based on the data collection request and a trigger event of the received rule from operation 650. In some embodiments, the determination is made based on an identity of the user that created the rule, an authorization level of the user that created the rule, a fee paid by the user that created the rule or other suitable criteria. In some embodiments, the operation 660 is similar to the operation 515 (FIG. 5), and detailed discussion of the operation 660 is omitted for the sake of brevity.

Determining whether the vehicle system is capable of satisfying the rule helps to improve efficiency in the use of the vehicle system. The vehicle system has a finite amount of resources, so executing portions of a rule that the vehicle system cannot fully satisfy will consume resources of the vehicle system with no ability to provide the requested data. As a result, a risk that another rule is not processed increases, which limits value derived from the ability to collect requested data from the vehicle system.

In response to a determination that the vehicle system is incapable of satisfying the rule, the method 600B proceeds to operation 670. In response to a determination that the vehicle is capable of satisfying the rule, the method 600B proceeds to operation 655.

In operation 655, the rule is transmitted to the vehicle. In some embodiments, the rule is transmitted wirelessly. In some embodiments, the rule is transmitted via a wired connection. In some embodiments, the rule is transmitted to multiple vehicles simultaneously. That is, in some embodiments, the rule is transmitted to all vehicles that are capable of satisfying the rule.

In operation 670, an alert is generated indicating that the vehicle system is not capable of satisfying the rule. In some embodiments, the alert includes an audio alert or a visual alert. In some embodiments, the vehicle system 410 is configured to transmit the alert to the user, e.g., using the accessible console 150 (FIG. 1), the UI 110 (FIG. 1), or another suitable device. In some embodiments, the operation 670 is similar to the operation 517 (FIG. 5) and a detailed description of the operation 670 is omitted for the sake of brevity.

The generation of the alert helps with allowing the user to determine whether to adjust data collection requests for a rule based on the type of information that the user is able to obtain from the vehicle system. The alert helps to avoid a situation where the user is unaware that the rule that was created is not being implemented by the vehicle system.

In some embodiments, the operation 670 is omitted where the user is not alerted regarding the inability of the vehicle system to satisfy the rule. In such embodiments, the method 600B proceeds from operation 660 to operation 675 in response to a determination that the vehicle system is incapable of satisfying the rule.

In operation 675, one or more alternatives are offered to the user. In some embodiments, the operation 675 includes functionality similar to that described with respect to the operation 517 (FIG. 5). However, in addition to the functionality described in operation 517 (FIG. 5), the operation 675 includes information related to vehicle systems for other vehicles. Therefore, in addition to the functionality of operation 517 (FIG. 5), the operation 675 is able to offer different vehicles that are capable of satisfying the rule. In some embodiments, the operation 675 is omitted where the user is offered alternatives for different vehicles or criteria for satisfying the rule.

One of ordinary skill in the art would understand that modifications to the method 600B are within the scope of this description. In some embodiments, at least one additional operation is included in the method 600B. For example, in some embodiments the method 600B further includes transmitting a notification to the user terminal, e.g., user terminal 460 (FIG. 4), that a rule was transmitted to one or more vehicles. In some embodiments, at least one operation of the method 600B is excluded. For example, in some embodiments, the operation 670 is excluded in situations where no alert is to be generated. In some embodiments, an order of operation of the method 600B is adjusted. For example, in some embodiments, operation 655 occurs prior to the operation 650. One of ordinary skill in the art would understand that other modifications to the method 600B are within the scope of this description.

FIG. 7 is a diagram of a system 700 for implementing a request retrieval system in accordance with some embodiments. System 700 includes a hardware processor 702 and a non-transitory, computer readable storage medium 704 encoded with, i.e., storing, the computer program code 706, i.e., a set of executable instructions. Computer readable storage medium 704 is also encoded with instructions 707 for interfacing with external devices. The processor 702 is electrically coupled to the computer readable storage medium 704 via a bus 708. The processor 702 is also electrically coupled to an I/O interface 710 by bus 708. A network interface 712 is also electrically connected to the processor 702 via bus 708. Network interface 712 is connected to a network 714, so that processor 702 and computer readable storage medium 704 are capable of connecting to external elements via network 714. The processor 702 is configured to execute the computer program code 706 encoded in the computer readable storage medium 704 in order to cause system 700 to be usable for performing a portion or all of the operations as described in request retrieval system 100 (FIG. 1), request retrieval system 400 (FIG. 4), method 500 (FIG. 5), method 600A (FIG. 6A) or method 600B (FIG. 6B).

In some embodiments, the processor 702 is a central processing unit (CPU), a multi-processor, a distributed processing system, an application specific integrated circuit (ASIC), and/or a suitable processing unit.

In some embodiments, the computer readable storage medium 704 is an electronic, magnetic, optical, electromagnetic, infrared, and/or a semiconductor system (or apparatus or device). For example, the computer readable storage medium 704 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 704 includes a compact disk-read only memory (CD-ROM), a compact disk-read/write (CD-R/W), and/or a digital video disc (DVD).

In some embodiments, the storage medium 704 stores the computer program code 706 configured to cause system 700 to perform a portion or all of the operations as described in request retrieval system 100 (FIG. 1), request retrieval system 400 (FIG. 4), method 500 (FIG. 5), method 600A (FIG. 6A) or method 600B (FIG. 6B). In some embodiments, the storage medium 704 also stores information needed for performing a portion or all of the operations as described in request retrieval system 100 (FIG. 1), request retrieval system 400 (FIG. 4), method 500 (FIG. 5), method 600A (FIG. 6A) or method 600B (FIG. 6B) as well as information generated during performing a portion or all of the operations as described in request retrieval system 100 (FIG. 1), request retrieval system 400 (FIG. 4), method 500 (FIG. 5), method 600A (FIG. 6A) or method 600B (FIG. 6B), such as a sensor data parameter 716, a rules parameter 718, a collected data parameter 720, a capabilities data parameter 722 and/or a set of executable instructions to perform a portion or all of the operations as described in request retrieval system 100 (FIG. 1), request retrieval system 400 (FIG. 4), method 500 (FIG. 5), method 600A (FIG. 6A) or method 600B (FIG. 6B).

In some embodiments, the storage medium 704 stores instructions 707 for interfacing with manufacturing machines. The instructions 707 enable processor 702 to generate manufacturing instructions readable by the manufacturing machines to effectively implement method 400 during a manufacturing process.

System 700 includes I/O interface 710. I/O interface 710 is coupled to external circuitry. In some embodiments, I/O interface 710 includes a keyboard, keypad, mouse, trackball, trackpad, and/or cursor direction keys for communicating information and commands to processor 702.

System 700 also includes network interface 712 coupled to the processor 702. Network interface 712 allows system 700 to communicate with network 714, to which one or more other computer systems are connected. Network interface 712 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in ODDR system 100 (FIG. 1), ODDR system 400 (FIG. 4), method 600A (FIG. 6A) or method 600B (FIG. 6B) is implemented in two or more systems 700, and information such as priority level, query ID, query status and query data are exchanged between different systems 700 via network 714.

Supplemental Note 1

A method of requesting data from a vehicle includes determining a capability of an in-vehicle system, wherein the capability includes at least one of processing capabilities, memory capabilities or sensor capabilities. The method further includes receiving a rule, wherein the rule comprises a data collection request. The method further includes determining whether the capability of the in-vehicle system is able to satisfy the data collection request. The method further includes discarding the rule in response to a determination that the capability of the in-vehicle system is not able to satisfy the data collection request.

Supplemental Note 2

The method of Supplemental Note 1, wherein the data collection request comprises a request to collect data from a first sensor; a duration of sensor data to collect; and a processing request for the sensor data.

Supplemental Note 3

The method of Supplemental Note 1 or 2, wherein determining whether the capability of the in-vehicle system is able to satisfy the data collection request comprises determining that the capability of the in-vehicle system is unable to satisfy the data collection request in response to a determination that the in-vehicle system is unable to satisfy any portion of the data collection request.

Supplemental Note 4

The method of any of Supplemental Notes 1-3, further comprising generating an alert in response to a determination that the determination that the capability of the in-vehicle system is not able to satisfy the data collection request.

Supplemental Note 5

The method of any of Supplemental Notes 1-4, wherein determining whether the capability of the in-vehicle system is able to satisfy the data collection request is based on an identity of a user associated with the rule.

Supplemental Note 6

The method of any of Supplemental Notes 1-5, wherein determining whether the capability of the in-vehicle system is able to satisfy the data collection request is based on a fee received in association with the rule.

Supplemental Note 7

The method of any of Supplemental Notes 1-6, further comprising, in response to a determination that the capability of the in-vehicle system is able to satisfy the data collection request: detecting a trigger event associated with the rule; and collecting data in accordance with the data collection request.

Supplemental Note 8

A system for requesting data from a vehicle includes a non-transitory computer readable medium, wherein the non-transitory computer readable medium is configured to store instructions thereon; and a processor connected to the non-transitory computer readable medium. The processor is configured to execute the instructions for determining a capability of an in-vehicle system, wherein the capability includes at least one of processing capabilities, memory capabilities or sensor capabilities. The processor is configured to execute the instructions for receiving a rule, wherein the rule comprises a data collection request. The processor is configured to execute the instructions for determining whether the capability of the in-vehicle system is able to satisfy the data collection request. The processor is configured to execute the instructions for discarding the rule in response to a determination that the capability of the in-vehicle system is not able to satisfy the data collection request.

Supplemental Note 9

The system of Supplemental Note 8, wherein the data collection request comprises a request to collect data from a first sensor; a duration of sensor data to collect; and a processing request for the sensor data.

Supplemental Note 10

The system of Supplemental Note 9 or 10, wherein the processor is configured to execute the instructions for determining whether the capability of the in-vehicle system is able to satisfy the data collection request by determining that the capability of the in-vehicle system is unable to satisfy the data collection request in response to a determination that the in-vehicle system is unable to satisfy any portion of the data collection request.

Supplemental Note 11

The system of any of Supplemental Notes 8-10, wherein the processor is configured to execute the instructions for generating an alert in response to a determination that the determination that the capability of the in-vehicle system is not able to satisfy the data collection request.

Supplemental Note 12

The system of any of Supplemental Notes 8-11, wherein processor is configured to execute the instructions for determining whether the capability of the in-vehicle system is able to satisfy the data collection request based on an identity of a user associated with the rule.

Supplemental Note 13

The system of any of Supplemental Notes 8-12, wherein the processor is configured to execute the instructions for determining whether the capability of the in-vehicle system is able to satisfy the data collection request based on a fee received in association with the rule.

Supplemental Note 14

The system of any of Supplemental Notes 8-13, wherein the processor is configured to execute the instructions for, in response to a determination that the capability of the in-vehicle system is able to satisfy the data collection request: detecting a trigger event associated with the rule; and collecting data in accordance with the data collection request.

Supplemental Note 15

A non-transitory computer readable medium configured to store instructions thereon. The instructions are configured to cause a processor to execute operations for determining a capability of an in-vehicle system, wherein the capability includes at least one of processing capabilities, memory capabilities or sensor capabilities. The instructions are configured to cause a processor to execute operations for receiving a rule, wherein the rule comprises a data collection request. The instructions are configured to cause a processor to execute operations for determining whether the capability of the in-vehicle system is able to satisfy the data collection request. The instructions are configured to cause a processor to execute operations for discarding the rule in response to a determination that the capability of the in-vehicle system is not able to satisfy the data collection request.

Supplemental Note 16

The non-transitory computer readable medium of Supplemental Note 15, wherein the instructions are configured to cause the processor to determine whether the capability of the in-vehicle system is able to satisfy the data collection request by determining that the capability of the in-vehicle system is unable to satisfy the data collection request in response to a determination that the in-vehicle system is unable to satisfy any portion of the data collection request.

Supplemental Note 17

The non-transitory computer readable medium of Supplemental Note 15 or 16, wherein the instructions are configured to cause the processor to generate an alert in response to a determination that the determination that the capability of the in-vehicle system is not able to satisfy the data collection request.

Supplemental Note 18

The non-transitory computer readable medium of any of Supplemental Notes 15-17, wherein the instructions are configured to cause the processor to determine whether the capability of the in-vehicle system is able to satisfy the data collection request based on an identity of a user associated with the rule.

Supplemental Note 19

The non-transitory computer readable medium of any of Supplemental Notes 15-18, wherein the instructions are configured to cause the processor to determine whether the capability of the in-vehicle system is able to satisfy the data collection request based on a fee received in association with the rule.

Supplemental Note 20

The non-transitory computer readable medium of any of Supplemental Notes 15-19, wherein the instructions are configured to cause the processor to, in response to a determination that the capability of the in-vehicle system is able to satisfy the data collection request: detect a trigger event associated with the rule; and collect data in accordance with the data collection request.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of requesting data from a vehicle, the method comprising:
   determining a capability of an in-vehicle system, wherein the capability includes at least one of processing capabilities, memory capabilities or sensor capabilities, and determining the capability of the in-vehicle system comprises querying at least one component of the in-vehicle system;
   receiving a rule from a device external from the vehicle, wherein the rule comprises a data collection request, and the data collection request comprises:
      a trigger event, and
      an indication of data requested for collection in response to detection of the trigger event;
   determining whether the capability of the in-vehicle system is able to satisfy the data collection request, wherein the determining is based on:
      an ability of the in-vehicle system to detect occurrence of the trigger event, and
      an ability of the in-vehicle system to collect the data requested in response to detection of the trigger event; and
   discarding the rule in response to a determination that the capability of the in-vehicle system is not able to satisfy the data collection request, wherein an ability to satisfy the data collection request includes both of:
      the ability of the in-vehicle system to detect occurrence of the trigger event, and
      the ability of the in-vehicle system to collect the data requested in response to detection of the trigger event,
   wherein discarding the rule comprises maintaining processing capabilities and sensor capabilities of the in-vehicle system.

2. The method of claim 1, wherein the data collection request comprises:
   a request to collect data from a first sensor;
   a duration of sensor data to collect; and
   a processing request for the sensor data.

3. The method of claim 2, wherein determining whether the capability of the in-vehicle system is able to satisfy the data collection request comprises determining that the capability of the in-vehicle system is unable to satisfy the data collection request in response to a determination that the in-vehicle system is unable to satisfy any portion of the data collection request.

4. The method of claim 1, further comprising generating an alert in response to a determination that the determination that the capability of the in-vehicle system is not able to satisfy the data collection request.

5. The method of claim 1, wherein determining whether the capability of the in-vehicle system is able to satisfy the data collection request is based on an identity of a user associated with the rule.

6. The method of claim 1, wherein determining whether the capability of the in-vehicle system is able to satisfy the data collection request is based on a fee received in association with the rule.

7. The method of claim 1, further comprising, in response to a determination that the capability of the in-vehicle system is able to satisfy the data collection request:
   detecting the trigger event associated with the rule; and
   collecting data in accordance with the data collection request.

8. A system for requesting data from a vehicle, the system comprising:
   a non-transitory computer readable medium, wherein the non-transitory computer readable medium is configured to store instructions thereon; and
   a processor connected to the non-transitory computer readable medium, wherein the processor is configured to execute the instructions for:
      determining a capability of an in-vehicle system, wherein the capability includes at least one of processing capabilities, memory capabilities or sensor capabilities, and determining the capability of the in-vehicle system comprises querying to at least one component of the in-vehicle system;
      receiving a rule from a device external from the vehicle, wherein the rule comprises a data collection request, and the data collection request comprises:
         a trigger event, and
         an indication of data requested for collection in response to detection of the trigger event;
      determining whether the capability of the in-vehicle system is able to satisfy the data collection request, wherein the determining is based on:
         an ability of the in-vehicle system to detect occurrence of the trigger event, and
         an ability of the in-vehicle system to collect the data requested in response to detection of the trigger event; and
      discarding the rule in response to a determination that the capability of the in-vehicle system is not able to satisfy the data collection request, wherein an ability to satisfy the data collection request includes both of:
         the ability of the in-vehicle system to detect occurrence of the trigger event, and
         the ability of the in-vehicle system to collect the data requested in response to detection of the trigger event,
      wherein discarding the rule comprises maintaining processing capabilities and sensor capabilities of the in-vehicle system.

9. The system of claim 8, wherein the data collection request comprises:
   a request to collect data from a first sensor;
   a duration of sensor data to collect; and
   a processing request for the sensor data.

10. The system of claim 9, wherein the processor is configured to execute the instructions for determining whether the capability of the in-vehicle system is able to satisfy the data collection request by determining that the capability of the in-vehicle system is unable to satisfy the data collection request in response to a determination that the in-vehicle system is unable to satisfy any portion of the data collection request.

11. The system of claim 8, wherein the processor is configured to execute the instructions for generating an alert in response to a determination that the determination that the capability of the in-vehicle system is not able to satisfy the data collection request.

12. The system of claim 8, wherein processor is configured to execute the instructions for determining whether the capability of the in-vehicle system is able to satisfy the data collection request based on an identity of a user associated with the rule.

13. The system of claim 8, wherein the processor is configured to execute the instructions for determining whether the capability of the in-vehicle system is able to satisfy the data collection request based on a fee received in association with the rule.

14. The system of claim 8, wherein the processor is configured to execute the instructions for, in response to a determination that the capability of the in-vehicle system is able to satisfy the data collection request:
   detecting the trigger event associated with the rule; and
   collecting data in accordance with the data collection request.

15. A non-transitory computer readable medium configured to store instructions thereon, wherein the instructions are configured to cause a processor to execute operations for:
   determining a capability of an in-vehicle system, wherein the capability includes at least one of processing capabilities, memory capabilities or sensor capabilities, and determining the capability of the in-vehicle system comprises querying to at least one component of the in-vehicle system;
   receiving a rule from a device external from the vehicle, wherein the rule comprises a data collection request, and the data collection request comprises:
      a trigger event, and
      an indication of data requested for collection in response to detection of the trigger event;
   determining whether the capability of the in-vehicle system is able to satisfy the data collection request, wherein the determining is based on;
      an ability of the in-vehicle system to detect occurrence of the trigger event, and
      an ability of the in-vehicle system to collect the data requested in response to detection of the trigger event; and
   discarding the rule in response to a determination that the capability of the in-vehicle system is not able to satisfy the data collection request, wherein an ability to satisfy the data collection request includes both of:
      the ability of the in-vehicle system to detect occurrence of the trigger event, and
      the ability of the in-vehicle system to collect the data requested in response to detection of the trigger event,
   wherein discarding the rule comprises maintaining processing capabilities and sensor capabilities of the in-vehicle system.

16. The non-transitory computer readable medium of claim 15, wherein the instructions are configured to cause the processor to determine whether the capability of the in-vehicle system is able to satisfy the data collection request by determining that the capability of the in-vehicle system is unable to satisfy the data collection request in response to a determination that the in-vehicle system is unable to satisfy any portion of the data collection request.

17. The non-transitory computer readable medium of claim 15, wherein the instructions are configured to cause the processor to generate an alert in response to a determination that the determination that the capability of the in-vehicle system is not able to satisfy the data collection request.

18. The non-transitory computer readable medium of claim 15, wherein the instructions are configured to cause the processor to determine whether the capability of the in-vehicle system is able to satisfy the data collection request based on an identity of a user associated with the rule.

19. The non-transitory computer readable medium of claim 15, wherein the instructions are configured to cause the processor to determine whether the capability of the in-vehicle system is able to satisfy the data collection request based on a fee received in association with the rule.

20. The non-transitory computer readable medium of claim 15, wherein the instructions are configured to cause the processor to, in response to a determination that the capability of the in-vehicle system is able to satisfy the data collection request:
   detect the trigger event associated with the rule; and
   collect data in accordance with the data collection request.

* * * * *